US012713397B2

(12) United States Patent
Uchino et al.

(10) Patent No.: US 12,713,397 B2
(45) Date of Patent: Aug. 18, 2026

(54) TECHNIQUES FOR PAGING OFFLOADING

(71) Applicant: QUALCOMM Incorporated, San Diego, CA (US)

(72) Inventors: Toru Uchino, Zushi (JP); Bharat Shrestha, San Diego, CA (US); Umesh Phuyal, San Diego, CA (US); Xiao Feng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/189,663

(22) Filed: Mar. 24, 2023

(65) Prior Publication Data

US 2024/0323912 A1 Sep. 26, 2024

(51) Int. Cl.
*H04W 68/02* (2009.01)
*H04W 76/10* (2018.01)

(52) U.S. Cl.
CPC ........... *H04W 68/02* (2013.01); *H04W 76/10* (2018.02)

(58) Field of Classification Search
CPC ..... H04W 68/02; H04W 76/10; H04W 68/12; H04W 52/0216; H04W 48/16; H04W 68/00; H04W 88/06; H04W 24/02; H04W 36/08; H04W 68/005; H04W 48/18; H04W 48/10; H04W 88/04; H04W 48/20; H04W 4/08; H04W 84/005; H04W 4/029; H04W 60/04; H04W 36/0009; H04W 68/025;
(Continued)

(56) References Cited

U.S. PATENT DOCUMENTS

2011/0122862 A1* 5/2011 Yun ........................ H04W 88/02 370/479
2014/0119256 A1* 5/2014 Kim ...................... H04W 76/28 370/311
(Continued)

FOREIGN PATENT DOCUMENTS

EP 4145923 A1 3/2023
WO 2021207266 A1 10/2021
WO 2022053347 A1 3/2022

OTHER PUBLICATIONS

International Search Report and Written Opinion—PCT/US2024/016882—ISA/EPO—Aug. 29, 2024 (2302458WO).
(Continued)

*Primary Examiner* — Nimesh Patel
(74) *Attorney, Agent, or Firm* — Holland & Hart LLP

(57) ABSTRACT

Methods, systems, and devices for wireless communications are described. In some examples, a user equipment (UE) may receive a control message indicating one or more parameters associated with selecting one or more cells. The UE may select one or more first cells to monitor for a paging message based on the one or more parameters and may monitor the one or more first cells for the paging message in an idle mode, inactive mode, or any non-connected mode based on the selection. Additionally, the UE may select one of the one or more first cells or a second cell to establish a connection based on monitoring for the paging message and may establish the connection with the one of the one or more first cells or the second cell based on the selection.

30 Claims, 16 Drawing Sheets

(58) Field of Classification Search
CPC ............. H04W 72/23; H04W 52/0212; H04W 28/0215; H04W 72/30; H04W 28/18; H04W 36/00692; H04W 72/20; H04W 76/11; H04W 36/0007; H04W 72/04; H04W 84/042; H04W 16/32; H04W 28/16; H04W 28/0284; H04W 8/24; H04W 8/22; H04W 8/20; H04W 8/186; H04W 28/26; H04W 16/24; H04W 16/26; H04W 16/18; H04W 16/08; H04W 88/16; H04W 92/20; H04W 16/04; H04W 36/03; H04W 74/00; Y02D 30/70; H04B 7/0617; H04B 17/3913; H04B 1/7103; H04B 2201/70702; H04B 2201/709709; H04B 17/382; H04B 7/15507; H04L 67/60; H04L 1/0071; H04L 1/1812; H04L 12/2854; H04L 12/5692; H04L 41/0803; H04L 47/10; H04L 2012/5607; H04L 2012/5614; H04L 2012/5619; H04L 43/062; H04L 43/0882
See application file for complete search history.

(56) References Cited

U.S. PATENT DOCUMENTS

| | | | | |
|---|---|---|---|---|
| 2022/0225272 | A1* | 7/2022 | Yang | H04W 48/10 |
| 2023/0337186 | A1* | 10/2023 | Toskala | H04W 68/12 |
| 2024/0008134 | A1* | 1/2024 | Martinez Tarradell | H04W 76/27 |

OTHER PUBLICATIONS

Partial International Search Report—PCT/US2024/016882—ISA/EPO—Jul. 8, 2024 (2302458WO).

* cited by examiner

TECHNIQUES FOR PAGING OFFLOADING

FIELD OF TECHNOLOGY

The following relates to wireless communications, including techniques for paging offloading.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for paging offloading. Generally, the techniques described herein may enable a user equipment (UE) to select one or more first cells to monitor for a paging message and one or more second cells to establish a connection with based on monitoring for the paging message, where the one or more first cells may be the same as or different than the one or more second cells. For example, the UE may receive a control message indicating one or more parameters associated with selecting one or more cells (e.g., of a network entity) for paging monitoring, for connection establishment, or both. The UE may select one or more first cells to monitor for a paging message based on the one or more parameters and may monitor the one or more first cells for the paging message in an idle mode, inactive mode, or any non-connected mode based on the selection. Additionally, the UE may select one of the one or more first cells or a second cell to establish a connection based on monitoring for the paging message and may establish the connection with the one of the one or more first cells or the second cell based on the second selection.

A method is described. The method may include receiving a control message indicating one or more parameters associated with selecting one or more cells, selecting one or more first cells to monitor for a paging message based on the one or more parameters, monitoring the one or more first cells for the paging message in an idle mode, inactive mode, or any non-connected mode based on the selection, selecting one of the one or more first cells or a second cell to establish a connection based on monitoring for the paging message, and establishing a connection with the one of the one or more first cells or the second cell based on the second selection.

An apparatus is described. The apparatus may include a processor and a memory coupled with the processor, with instructions stored in the memory. The instructions may be executable by the processor to cause the apparatus to receive a control message indicating one or more parameters associated with selecting one or more cells, select one or more first cells to monitor for a paging message based on the one or more parameters, monitor the one or more first cells for the paging message in an idle mode, inactive mode, or any non-connected mode based on the selection, select one of the one or more first cells or a second cell to establish a connection based on monitoring for the paging message, and establish a connection with the one of the one or more first cells or the second cell based on the second selection.

Another apparatus is described. The apparatus may include means for receiving a control message indicating one or more parameters associated with selecting one or more cells, means for selecting one or more first cells to monitor for a paging message based on the one or more parameters, means for monitoring the one or more first cells for the paging message in an idle mode, inactive mode, or any non-connected mode based on the selection, means for selecting one of the one or more first cells or a second cell to establish a connection based on monitoring for the paging message, and means for establishing a connection with the one of the one or more first cells or the second cell based on the second selection.

A non-transitory computer-readable medium storing code is described. The code may include instructions executable by a processor to receive a control message indicating one or more parameters associated with selecting one or more cells, select one or more first cells to monitor for a paging message based on the one or more parameters, monitor the one or more first cells for the paging message in an idle mode, inactive mode, or any non-connected mode based on the selection, select one of the one or more first cells or a second cell to establish a connection based on monitoring for the paging message, and establish a connection with the one of the one or more first cells or the second cell based on the second selection.

Some examples of the method, apparatuses, and non-transitory computer-readable medium described herein may further include operations, features, means, or instructions for selecting the one of the one or more first cells or the second cell may be based on the one or more parameters.

Some examples of the method, apparatuses, and non-transitory computer-readable medium described herein may further include operations, features, means, or instructions for selecting the one of the one or more first cells or the second cell may be based on one or more conditions at the user equipment (UE).

In some examples of the method, apparatuses, and non-transitory computer-readable medium described herein, the control message may be received from one of the one or more first cells or the second cell.

In some examples of the method, apparatuses, and non-transitory computer-readable medium described herein, the one or more first cells includes at least a first cell associated with a NTN, and the second cell may be associated with a TN.

In some examples of the method, apparatuses, and non-transitory computer-readable medium described herein, the one or more first cells includes at least a first cell associated with a NTN and a first cell associated with TN.

In some examples of the method, apparatuses, and non-transitory computer-readable medium described herein, the one or more parameters indicate frequency information, RAT information, network information, tracking area information, one or more cell identifiers, one or more PLMN identifiers, one or more slicing identifiers, a type of core network, a duration associated with monitoring the one or more first cells, or any combination thereof.

Some examples of the method, apparatuses, and non-transitory computer-readable medium described herein may further include operations, features, means, or instructions for stopping monitoring of the one or more first cells based on expiration of a timer, where a duration of the timer may be based on the indicated duration.

Some examples of the method, apparatuses, and non-transitory computer-readable medium described herein may further include operations, features, means, or instructions for transmitting a capability message indicating a capability of the UE to support at least selection of the one or more first cells for paging monitoring or selection of the one of the one or more first cells or the second cell for connection establishment.

In some examples of the method, apparatuses, and non-transitory computer-readable medium described herein, the capability message includes an indication of one or more supported frequency bands, one or more supported RATs, one or more supported types of networks, one or more supported types of core networks, a battery status of the UE, a quantity of supported cells, or any combination thereof.

Some examples of the method, apparatuses, and non-transitory computer-readable medium described herein may further include operations, features, means, or instructions for receiving the paging message from each of the one or more first cells.

Some examples of the method, apparatuses, and non-transitory computer-readable medium described herein may further include operations, features, means, or instructions for receiving the paging message from one of the one or more first cells.

Some examples of the method, apparatuses, and non-transitory computer-readable medium described herein may further include operations, features, means, or instructions for selecting the one or more first cells to receive the paging message based on failing to detect the second cell.

Some examples of the method, apparatuses, and non-transitory computer-readable medium described herein may further include operations, features, means, or instructions for transmitting a failure message based on failing to detect the second cell or a third cell.

In some examples of the method, apparatuses, and non-transitory computer-readable medium described herein, the second cell is a first available cell associated with an NTN and the third cell is a second available cell associated with the NTN.

In some examples of the method, apparatuses, and non-transitory computer-readable medium described herein, establishing the connection may include operations, features, means, or instructions for establishing the connection with the one of the one or more first cells based on failing to detect the second cell or establishing the connection with the second cell.

In some examples of the method, apparatuses, and non-transitory computer-readable medium described herein, the paging message indicates a group identifier associated with a group including at least the UE.

In some examples of the method, apparatuses, and non-transitory computer-readable medium described herein, the group identifier includes a P-RNTI.

Some examples of the method, apparatuses, and non-transitory computer-readable medium described herein may further include operations, features, means, or instructions for receiving a second control message indicating an occasion for transmission of the paging message.

In some examples of the method, apparatuses, and non-transitory computer-readable medium described herein, the second control message indicates an identifier associated with the UE.

A method for wireless communications at a core network entity is described. The method may include receiving, from a first network entity, a control message requesting the core network entity to transmit paging messages via a second network entity, transmitting an acknowledgment message responsive to the control message, and transmitting, to a UE, a paging message via the first network entity, the second network entity, or both, based on the acknowledgment message.

An apparatus for wireless communications at a core network entity is described. The apparatus may include a processor and a memory coupled with the processor, with instructions stored in the memory. The instructions may be executable by the processor to cause the apparatus to receive, from a first network entity, a control message requesting the core network entity to transmit paging messages via a second network entity, transmit an acknowledgment message responsive to the control message, and transmit, to a UE, a paging message via the first network entity, the second network entity, or both, based on the acknowledgment message.

Another apparatus for wireless communications at a core network entity is described. The apparatus may include means for receiving, from a first network entity, a control message requesting the core network entity to transmit paging messages via a second network entity, means for transmitting an acknowledgment message responsive to the control message, and means for transmitting, to a UE, a paging message via the first network entity, the second network entity, or both, based on the acknowledgment message.

A non-transitory computer-readable medium storing code for wireless communications at a core network entity is described. The code may include instructions executable by a processor to receive, from a first network entity, a control message requesting the core network entity to transmit paging messages via a second network entity, transmit an acknowledgment message responsive to the control message, and transmit, to a UE, a paging message via the first network entity, the second network entity, or both, based on the acknowledgment message.

In some examples of the method, apparatuses, and non-transitory computer-readable medium described herein, transmitting the paging message may include operations, features, means, or instructions for transmitting the paging message via the second network entity.

Some examples of the method, apparatuses, and non-transitory computer-readable medium described herein may further include operations, features, means, or instructions for receiving a message indicating failure of the UE to detect the second network entity, where transmitting the paging message via the first network entity may be based on the UE failing to detect the second network entity.

In some examples of the method, apparatuses, and non-transitory computer-readable medium described herein, transmitting the paging message may include operations, features, means, or instructions for transmitting the paging message via the first network entity.

Some examples of the method, apparatuses, and non-transitory computer-readable medium described herein may further include operations, features, means, or instructions for receiving a second control message indicating the first network entity established a connection with the UE based on the UE receiving the paging message.

Some examples of the method, apparatuses, and non-transitory computer-readable medium described herein may further include operations, features, means, or instructions for transmitting a second acknowledgment message responsive to the second control message.

In some examples of the method, apparatuses, and non-transitory computer-readable medium described herein, the paging message indicates a group identifier associated with a group including at least the UE.

In some examples of the method, apparatuses, and non-transitory computer-readable medium described herein, the group identifier includes a P-RNTI.

Some examples of the method, apparatuses, and non-transitory computer-readable medium described herein may further include operations, features, means, or instructions for receiving a second control message indicating an occasion for transmission of the paging message.

In some examples of the method, apparatuses, and non-transitory computer-readable medium described herein, the second control message indicates an identifier associated with the UE.

In some examples of the method, apparatuses, and non-transitory computer-readable medium described herein, the first network entity may be associated with a TN and the second network entity may be associated with a NTN.

A method for wireless communications at a first network entity is described. The method may include transmitting, to a core network entity, a first control message requesting the core network entity to transmit paging messages via a second network entity, receiving an acknowledgment message responsive to the first control message, and transmitting, to a UE, a second control message indicating one or more parameters associated with the UE selecting one or more cells to monitor for a paging message in an idle, inactive or any non-connected mode and with the UE selecting one or more cells to establish a connection.

An apparatus for wireless communications at a first network entity is described. The apparatus may include a processor and a memory coupled with the processor, with instructions stored in the memory. The instructions may be executable by the processor to cause the apparatus to transmit, to a core network entity, a first control message requesting the core network entity to transmit paging messages via a second network entity, receive an acknowledgment message responsive to the first control message, and transmit, to a UE, a second control message indicating one or more parameters associated with the UE selecting one or more cells to monitor for a paging message in an idle, inactive or any non-connected mode and with the UE selecting one or more cells to establish a connection.

Another apparatus for wireless communications at a first network entity is described. The apparatus may include means for transmitting, to a core network entity, a first control message requesting the core network entity to transmit paging messages via a second network entity, means for receiving an acknowledgment message responsive to the first control message, and means for transmitting, to a UE, a second control message indicating one or more parameters associated with the UE selecting one or more cells to monitor for a paging message in an idle, inactive or any non-connected mode and with the UE selecting one or more cells to establish a connection.

A non-transitory computer-readable medium storing code for wireless communications at a first network entity is described. The code may include instructions executable by a processor to transmit, to a core network entity, a first control message requesting the core network entity to transmit paging messages via a second network entity, receive an acknowledgment message responsive to the first control message, and transmit, to a UE, a second control message indicating one or more parameters associated with the UE selecting one or more cells to monitor for a paging message in an idle, inactive or any non-connected mode and with the UE selecting one or more cells to establish a connection.

In some examples of the method, apparatuses, and non-transitory computer-readable medium described herein, the one or more parameters indicate frequency information, RAT information, network information, tracking area information, one or more cell identifiers, one or more PLMN identifiers, one or more slicing identifiers, a type of core network, a duration associated with monitoring the one or more selected cells, or any combination thereof.

Some examples of the method, apparatuses, and non-transitory computer-readable medium described herein may further include operations, features, means, or instructions for receiving a capability message indicating a capability of the UE to support at least selection of the one or more cells to monitor for the paging message or selection of the one or more cells to establish the connection.

In some examples of the method, apparatuses, and non-transitory computer-readable medium described herein, the capability message includes an indication of one or more supported frequency bands, one or more supported RATs, one or more supported types of networks, one or more supported types of core networks, a battery status of the UE, a quantity of supported cells, or any combination thereof.

Some examples of the method, apparatuses, and non-transitory computer-readable medium described herein may further include operations, features, means, or instructions for receiving the paging message from the core network entity and forwarding the paging message to the UE.

Some examples of the method, apparatuses, and non-transitory computer-readable medium described herein may further include operations, features, means, or instructions for establishing the connection with the UE.

Some examples of the method, apparatuses, and non-transitory computer-readable medium described herein may further include operations, features, means, or instructions for transmitting, to the core network entity, a third control message indicating the first network entity established the connection with the UE.

Some examples of the method, apparatuses, and non-transitory computer-readable medium described herein may further include operations, features, means, or instructions for receiving a second acknowledgment message responsive to the third control message.

DETAILED DESCRIPTION

Some wireless devices, such as user equipments (UEs), may support one or more of an idle mode, an inactive mode, or a non-connected mode. In such cases, the UE may monitor a paging channel during a paging occasion for a paging message transmitted by a cell of a core network. The paging message may indicate for the UE to wake up to receive communications from the cell. In some examples, multiple cells of the core network may be associated with a tracking area, or an area in which the UE may be located, and each cell may be associated with a coverage area within the tracking area. As such, the core network may be unaware of which cell may be associated with a coverage area in which the UE is located. As such, the core network may transmit a paging message via each cell of the multiple cells, which may result in inefficient resource utilization.

As such, techniques described herein may enable the core network to offload paging from the multiple cells, each associated with a coverage area that is a portion of the tracking area, to an additional cell that is associated with a coverage area that includes the entire tracking area. For example, the multiple cells may be associated with a terrestrial network (TN) while the additional cell may be associated with a non-terrestrial network (NTN). In such cases, the UE may be connected with a TN cell (e.g., associated with a first network entity) of the multiple TN cells and may monitor the TN cell for a paging message in an idle mode, inactive mode, or non-connected mode. The first network entity associated with the TN cell may transmit a paging redirect request to the core network requesting paging to be offloaded to a second network entity associated with an NTN cell. As such, the core network may transmit an acknowledgment message in response to the request and the TN cell may transmit a control message to the UE indicating one or more parameters associated with paging offloading. As such, the UE may monitor the NTN cell for a paging message and may establish a connection with the TN cell based on receiving the paging message via the NTN cell. In some examples, the UE may monitor the NTN cell and the TN cell for the paging message. As such, the UE may receive the paging message via the TN cell, the NTN cell, or both, and may establish the connection with the TN cell based on receiving the paging message via the TN cell, the NTN cell, or both.

Aspects of the disclosure are initially described in the context of wireless communications systems. Aspects of the disclosure are then described in the context of timing diagrams and a process flow. Aspects of the disclosure are further illustrated by and described with reference to apparatus diagrams, system diagrams, and flowcharts that relate to techniques for paging offloading.

Figure 1:
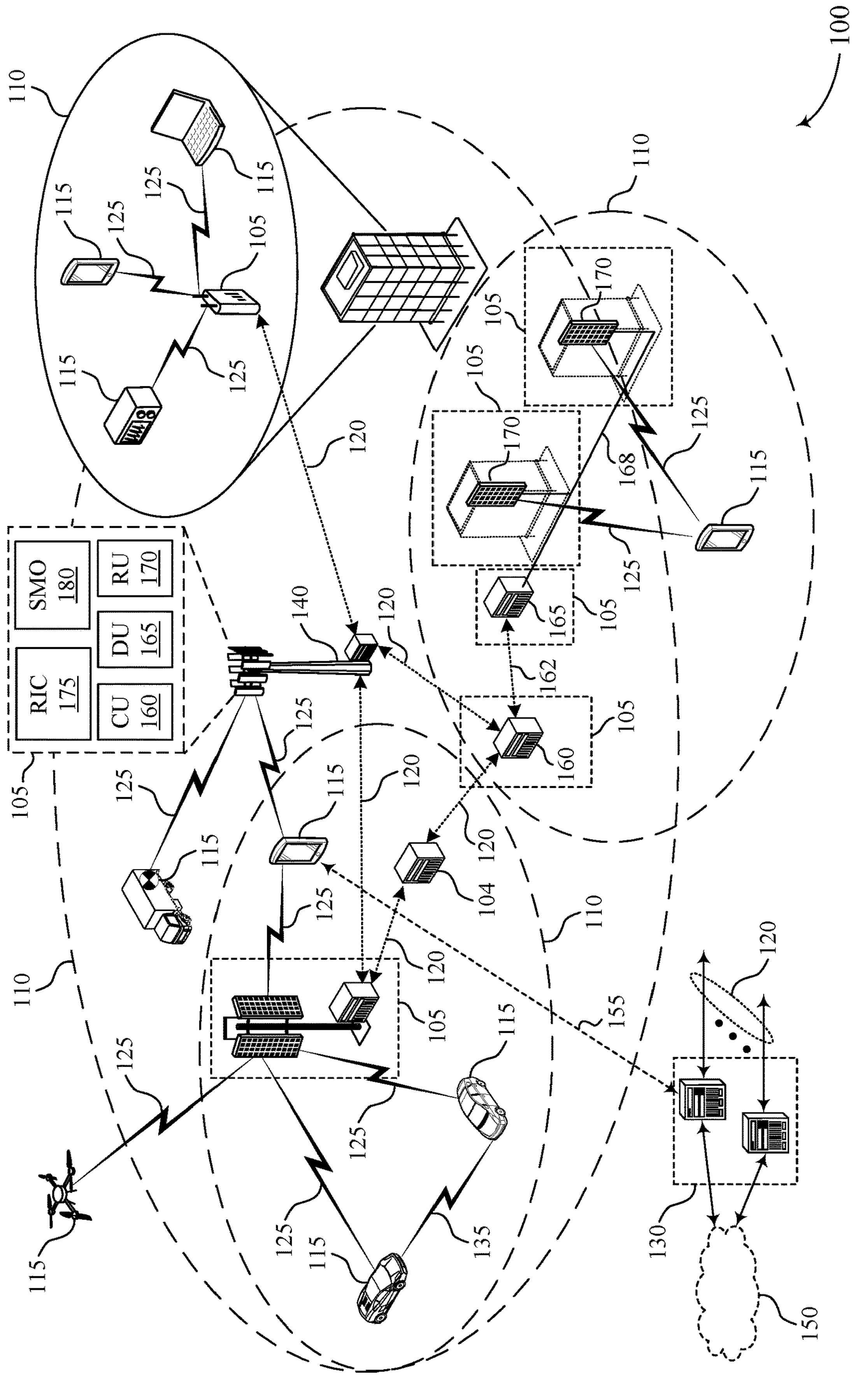
FIG. 1 shows an example of a wireless communications system that supports techniques for paging offloading in accordance with one or more aspects of the present disclosure.

FIG. 1 shows an example of a wireless communications system 100 that supports techniques for paging offloading in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network 130 via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for paging offloading as described herein. For example, some operations described as being performed by a UE 115 or a network entity 105 (e.g., a base station 140) may additionally, or alternatively, be performed by one or more components of the disaggregated RAN architecture (e.g., IAB nodes 104. DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). That is, a UE 115 may communicate with a network entity 105 via one or more cells (e.g., the UE 115 may identify cells rather than network entities 105). Conversely, the network entity 105 may communicate directly with a core network 130 (e.g., the network entity 105 may not communicate with the core network 130 through one or more cells). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may enable a core network 130 to offload paging from the multiple cells, each associated with a coverage area that is a portion of a tracking area associated with a UE 115, to an additional cell that is associated with a coverage area that includes the entire tracking area of the UE 115. For example, the multiple cells may be associated with a TN while the additional cell may be associated with a NTN. In such cases, the UE 115 may be connected with a TN cell of the multiple TN cells and may monitor the TN cell for a paging message in an idle mode, inactive mode, or non-connected mode. The TN cell may transmit a paging redirect request to the core network 130 requesting paging to be offloaded to an NTN cell. As such, the core network 130 may transmit an acknowledgment message in response to the request and the TN cell may transmit a control message to the UE 115 indicating one or more parameters associated with paging offloading. As such, the UE 115 may monitor the NTN cell for a paging message and may establish a connection with the TN cell based on receiving the paging message via the NTN cell. In some examples, the UE 115 may monitor the NTN cell and the TN cell for the paging message. As such, the UE 115 may receive the paging message via the TN cell, the NTN cell, or both, and may establish the connection with the TN cell based on receiving the paging message via the TN cell, the NTN cell, or both.

Figure 2:
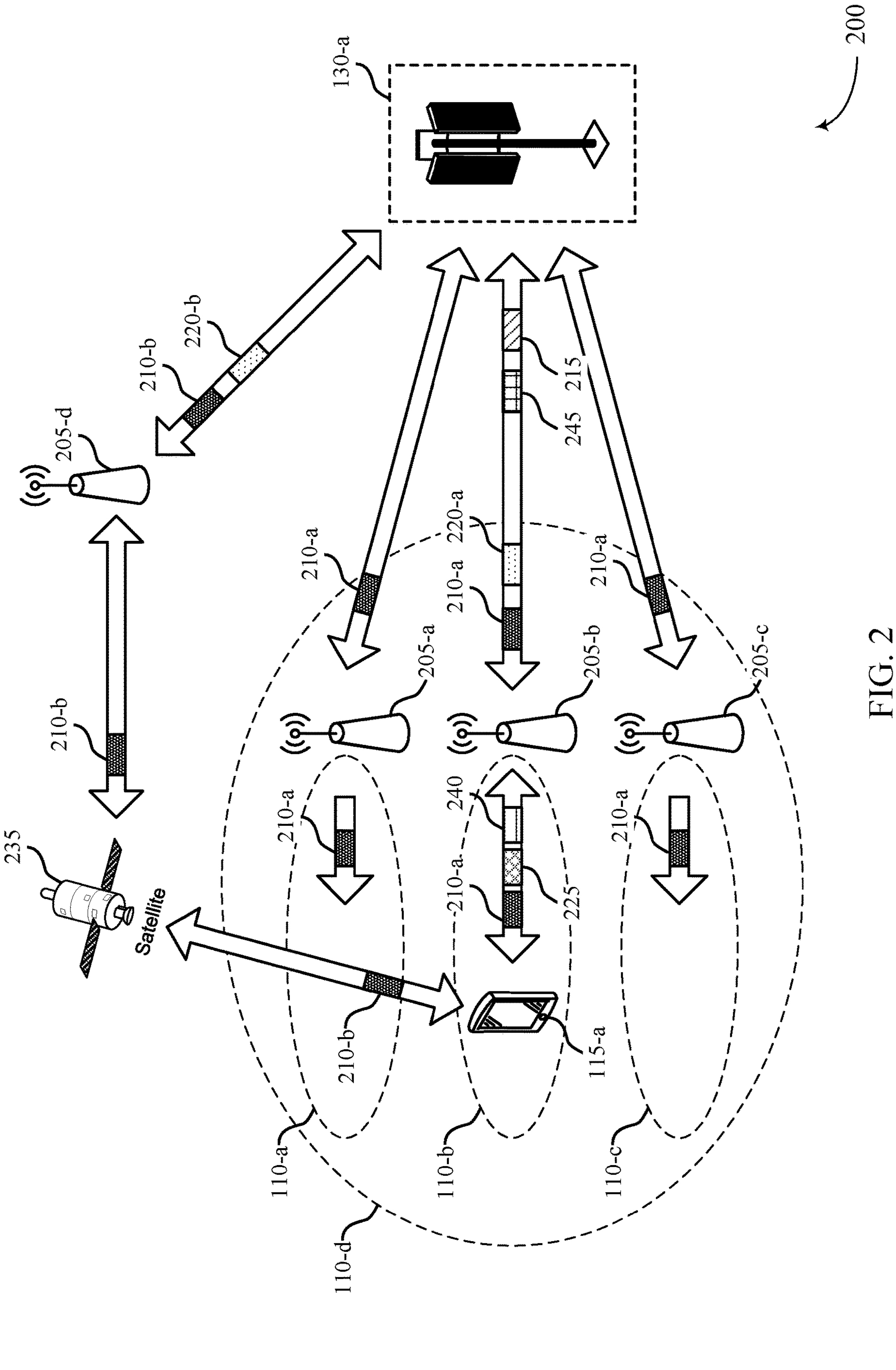
FIG. 2 shows an example of a wireless communications system that supports techniques for paging offloading in accordance with one or more aspects of the present disclosure.

FIG. 2 shows an example of a wireless communications system 200 that supports techniques for paging offloading in accordance with one or more aspects of the present disclosure. In some examples, the wireless communications system 200 may implement or be implemented by aspects of the wireless communications system 100. For example, the wireless communications system 200 may include one or more core networks (e.g., a core network 130-*a*), one or more network entities 105 (e.g., a cell 205-*a* associated with a first network entity 105, a cell 205-*b* associated with a second network entity 105, a cell 205-*c* associated with a third network entity 105, and a cell 205-*d* associated with a fourth network entity 105) and one or more UEs 115 (e.g., a UE 115-*a*), which may be examples of the corresponding devices as described with reference to FIG. 1.

Some wireless communications systems, such as the wireless communications system 200, may support wireless devices, such as the UE 115-*a*, operating in an idle mode (e.g., RRC_idle), an inactive mode (e.g., RRC_inactive), or any non-connected mode (e.g., state). In such cases, the UE 115-*a* may monitor one or more channels, such as a paging channel, for a paging message 210 transmitted by a cell 205 (e.g., associated with a network entity 105) associated with the core network 130-*a* (e.g., a core network entity). For example, the UE 115-*a* may operate in an idle mode and the UE 115-*a* may monitor the paging channel for a core network-initiated paging message 210. In another example, the UE 115-*a* may operate in an inactive mode (e.g., with no ongoing small data transmission (SDT) procedure), the UE 115-*a* may monitor the paging channel for a radio access network (RAN)-initiated paging message 210 and a core network-initiated paging message 210. A paging message 210 may indicate for the UE 115-*a* to wake up (e.g., exit the idle mode, inactive mode, or non-connected mode) to receive communications. In other words, the paging message 210 may enable the core network 130-*a* to communicate with (e.g., reach) the UE 115-*a*, operating in an idle mode, inactive mode, or non-connected mode, and to notify the UE 115-*a* of one or more changes to system information (e.g., and/or earthquake and tsunami warnings (ETWSs), commercial mobile alert service (CMAS) messages, or both).

In some examples, the UE 115-*a* may refrain from monitoring a paging channel continuously. In such cases, the UE 115-*a* may support a paging discontinuous reception (DRX) cycle. In such cases, the UE 115-*a*, operating in an idle mode, inactive mode, or non-connected mode, may monitor for paging messages 210 during (e.g., only during) a paging occasion. In such cases, the UE 115-*a* may support one paging occasion per paging DRX cycle. Additionally, or alternatively, the core network 130-*a* may indicate the paging DRX cycle to the UE 115-*a* (e.g., may configure the paging DRX cycle). In some examples (e.g., for core network-initiated paging), the core network 130-*a* may broadcast a default paging DRX cycle via system information. Additionally, or alternatively, the core network 130-*a* may indicating a UE-specific paging DRX cycle via non-access stratum (NAS) signaling. Additionally, or alternatively (e.g., for RAN-initiated paging), the core network 130-*a* may indicating a UE-specific paging DRX cycle via radio resource control (RRC) signaling (e.g., transmitted via a cell 205 associated with a network entity 105). In some cases, the UE 115-*a* may select (e.g., use) a shortest paging DRX cycle. For example, (e.g., the UE 115-*a* is operating in an RRC_idle mode), the UE 115-*a* may select a shortest paging DRX cycle out of the default paging DRX cycle indicated via broadcast and the UE-specific paging DRX cycle indicated via NAS signaling. In some other examples (e.g., the UE 115-*a* is operating in an RRC_inactive mode), the UE 115-*a* may select a shortest paging DRX cycle out of the default paging DRX cycle indicated via broadcast, the UE-specific paging DRX cycle indicated via NAS signaling, and the UE-specific paging DRX cycle indicated via RRC signaling.

In some examples, multiple cells 205, such as the cell 205-*a* associated with the first network entity 105, the cell 205-*b* associated with the second network entity 105, and the cell 205-*c* associated with the third network entity 105, may be associated with the core network 130-*a*. The first network entity 105, the second network entity 105, the third network entity 105, or any combination thereof may be a same network entity 105. Additionally, or alternatively, the first network entity 105, the second network entity 105, the third network entity 105, or any combination thereof may be a different network entities 105. In some cases, the cell 205-*a*, the cell 205-*b*, and the cell 205-*c* may be associated with a terrestrial network (TN) and may be referred to as a TN cell 205-*a*, a TN cell 205-*b*, and a TN cell 205-*c*. Additionally, each of the TN cell 205-*a*, the TN cell 205-*b*, and the TN cell 205-*c* may be associated with coverage areas 110, such as a coverage area 110-*a*, a coverage area 110-*b*, and a coverage area 110-*c*, respectively, within a tracking area of the UE 115-*a*. That is, the tracking area of the UE 115-*a* may be an area in which the UE 115-*a* may be located (e.g., with respect to the core network 130-*a*) and the coverage area 110-*a*, the coverage area 110-*b*, and the coverage area 110-*c* may collectively cover the tracking area of the UE 115-*a*. In some examples, a size of the tracking area of the UE 115-*a* may be based on (e.g., a tradeoff between) a tracking area update rate and a quantity of cells 205 supporting paging. For example, a small tracking area may be associated with less resource utilization (e.g., as compared to a larger tracking area) and more frequency tracking area updates (e.g., as compared to a larger tracking area). Conversely, a large tracking area may be associated with more resource utilization (e.g., as compared to a smaller tracking area) and less frequency tracking area updates (e.g., as compared to a smaller tracking area).

As such, the core network 130-*a* may be unaware of which network entity 105 (e.g., associated with a TN cell 205) may be associated with a coverage area 110 in which the UE 115-*a* is located (e.g., due to each coverage area 110 associated with the TN cell 205-*a*, the TN cell 205-*b*, and the TN cell 205-*c* failing to cover the entire tracking area of the UE 115-*a*). In such cases, the core network 130-*a* may transmit a paging message 210-*a* to each network entity 105 associated with a TN cell 205 and, in some examples, each TN cell 205 may forward (e.g., transmit) the paging message 210-*a*, however, the UE 115-*a* may receive the paging message 210-*a* from (e.g., from only) the TN cell 205-*b*, which may result in inefficient resource utilization. In other words, the core network 130-*a* may waste resources due to transmission of the paging message 210-*a* to the first network entity associated with the TN cell 205-*a* and the third network entity 105 associated with the TN cell 205-*c*, and the TN cell 205-*a* and the TN cell 205-*c* may waste resources due to forwarding of the paging message 210-*a*.

Accordingly, techniques described herein may enable the core network 130-*a* to offload paging from multiples cells 205 (e.g., associated with multiple network entities 105), each associated with a coverage area 110 that is a portion of the tracking area of the UE 115-*a* (e.g., the TN cell 205-*a*, the TN cell 205-*b*, and the TN cell 205-*c*), to an additional cell 205 (e.g., associated with an additional network entity 105) that is associated with a coverage area 110 that includes the tracking area 110 of the UE 115-*a* (e.g., a larger portion of the tracking area or the entire tracking area), which may support efficient resource utilization. In other words, the UE 115-*a* may release a connection with the cell 205-*b*, monitor for a paging message 210 from the additional cell 205, and attempt to establish a connection with the cell 205-*b* based on monitoring the additional cell 205 for the paging message (e.g., the UE 115-*a* may autonomously switch cells 205, or carriers, for paging and connection establishment). For example, the cell 205-*d* may be associated with a coverage area 110-*d*, where the coverage area 110-*d* covers the tracking area of the UE 115-*a*. In some examples, the cell 205-*d* may be associated with a non-terrestrial network (NTN) and may be referred to as an NTN cell 205-*d*. Additionally, the NTN cell 205-*d* may be associated with a fourth network entity 105 that may be the same as or different than the first network entity 105, the second network entity 105, the third network entity 105, or any combination thereof.

In such cases, the UE 115-*a* may communicate (e.g., be connected) with a TN cell 205, such as the TN cell 205-*b*, and the UE 115-*a* may enter an idle mode, an inactive mode, or a non-connected mode, and may monitor the TN cell 205-*b* for a paging message 210 (e.g., camp on the TN cell 205-*b*). The second network entity 105 associated with the TN cell 205-*b* may transmit a paging redirect request 215 to the core network 130-*a* requesting the core network 130-*a* offload paging from the second network entity 105 associated with the cell 205-*b* to an additional network entity 105 associated with an additional cell 205, such as the fourth network entity 105 associated with the NTN cell 205-*d*. In other words, the paging redirect request 215 may request the core network 130-*a* transmit paging messages 210 via the additional network entity 105 associated with the additional cell 205. The core network 130-*a* may transmit, to the second network entity 105 associated with the cell 205-*b*, an acknowledgment message 220-*a* responsive to the paging redirect request 215. As such, the TN cell 205-*b* may transmit a control message 225 to the UE 115-*a* indicating one or more parameters associated with offloading the paging. The one or more parameters may include a first subset of parameters associated with the UE 115-*a* selecting one or more cells 205 to monitor for paging messages 210 (e.g., one or more parameters associated with the NTN cell 205-*d*), a second subset of parameters associated with the UE 115-*a* selecting one or more cells 205 to establish a connection (e.g., one or more parameters associated with the TN cell 205-*b*), or both.

As such, the UE 115-*a* may monitor the NTN cell 205-*d* for a paging message 210 (e.g., camp on the NTN cell 205-*d*), as described with reference to FIG. 3. In some cases, the UE 115-*a* may also monitor the TN cell 205-*b* for a paging message 210, as described with reference to FIG. 4. The core network 130-*a* may transmit a paging message 210-*b* to the fourth network entity 105 associated with the NTN cell 205-*d* and the NTN cell 205-*d* may forward (e.g., transmit) the paging message 210-*b* to the UE 115-*a* via a satellite 235.

In some examples, the NTN cell 205-*d* may be associated with a large coverage area 110, as such, transmitting the paging message 210-*b* may wake up additional UEs 115 (e.g., a large quantity of UEs 115). The additional UEs 115 may be un-intended recipients of the paging message 210-*b* (e.g., un-intended UEs 115), may be unable to support communications via a TN cell 205, may be unable to support multi-connectivity between a TN cell 205 and an NTN cell 205, may not support paging offloading, or any combination thereof. As such, the paging message 210-*b* may include an indication of the UE 115-*a*, such that the additional UEs 115 may ignore the paging message 210-*b* (e.g., and save power). For example, the paging message 210-*b* may be associated with a group, including at least the UE 115-*a* (e.g., the paging message 210-*b* may be a group specific paging message 210-*b*). In such cases, the group may include UEs 115 capable of supporting paging offloading and the paging message 210-*b* may be different than a paging message 210 transmitted by the core network 130-*a* to a UE 115 that does not support paging offloading (e.g., the paging message 210-*b* may be a new group wake up signal may be configured by the core network 130-*a*). Additionally, or alternatively, the paging message 210-*b* may include a paging radio network temporary identifier (P-RNT) associated with the group. In such cases, the TN cell 205-*b* may indicate (e.g., configured) the P-RNTI to UEs 115 in the group (e.g., including at least the UE 115-*a*) while the UEs 115 operate in a connected mode (e.g., with the TN cell 205-*b*).

Additionally, or alternatively, the core network 130-*a* may transmit a control message 225 (e.g., direction indication short message) via the fourth network entity 105 associated with the NTN cell 205-*d* prior to transmission of the paging message 210-*b*. For example, the control message 225 (e.g., DCI message) may indicate a paging notification (e.g., mobile terminal call) for UEs 115 supporting paging offloading. UEs 115 not supporting paging offloading may refrain from receiving or decoding (e.g., may ignore) the control message 225. For example, a field (e.g., reserved field "00") in the control message 225 may indicate that scheduling information associated with paging indicated via the control message 225 may be for UEs 115 supporting paging offloading. Additionally, or alternatively, one or more bits (e.g., reserved bits) in the control message 225 may indicate a group identifier associated with the group of UEs 115 supporting paging offloading. In such cases, the group of UEs 115 may switch to the NTN cell 205-*d* (e.g., anchor cell 205) to receive the paging message 210-*b*. Additionally, or alternatively, the group of UEs 115 may monitor a paging occasion associated with the paging message 210-*b*. In some examples, the core network 130-*a* may indicating one or more resources associated with the paging occasion to the group of UEs 115 (e.g., the one or more resources may be pre-configured). The core network 130-*a* may transmit the paging message 210-*b* based on transmitting the control message 225 and the paging message 210-*b* may indicate an identifier associated with the UE 115-*a* (e.g., paged UE 115-*a*).

The UE 115-*a* may receive the paging message 210-*b* and attempt to detect and establish a connection with the TN cell 205-*b* (e.g., an anchor cell 205 where uplink and downlink transmission occurs) based on receiving the paging message 210-*b*. That is, the UE 115-*a* may transmit a random access channel (RACH) message 240 to the TN cell 205-*b* (e.g., upon detecting the TN cell 205-*b*) and may connect to the TN cell 205-*b* based on transmitting the RACH message 240. In some examples, the UE 115-*a* may refrain from monitoring (e.g., stop monitoring) the NTN cell 205-*d* for paging messages 210 after the UE 115-*a* establishes the connection with the TN cell 205-*b*. Alternatively, the UE 115-*a* may continue to monitor the NTN cell 205-*d* for paging messages 210 after the UE 115-*a* establishes the connection with the TN cell 205-*b*.

Additionally, the second network entity 105 associated with the TN cell 205-*b* may transmit a paging redirect disablement message 245 to the core network 130-*a* indicating that the second network entity 105 associated with the TN cell 205-*b* established the connection with the UE 115-*a*. As such, the core network 130-*a* may transmit an acknowledgment message 220-*b* to the fourth network entity 105 associated with the NTN cell 205-*d* in response to receiving the paging redirect disablement message 245. The acknowledgment message 220-*b* may indicate that the fourth network entity 105 associated with the NTN cell 205-*d* may disable paging offloading (e.g., may refrain from monitoring for a paging message 210 from the core network 130-*a* to forward to the UE 115-*a*).

In some examples, the UE 115-*a* may monitor the NTN cell 205-*d* for paging messages 210 and may attempt to establish a connection with the NTN cell 205-*d*, however, the UE 115-*a* may not be associated with a global navigation satellite system (GNSS) location. In such cases, the UE 115-*a* may perform uplink transmissions via the TN cell 205-*b* for connection establishment with the NTN cell 205-*d*.

In some examples, the UE 115-*a* may operate in an inactive mode with respect to the TN cell 205-*b* (e.g., NTN inactive mode) and may operate in an idle mode with respect to the NTN cell 205-*d* (e.g., TN idle mode). In some examples, paging via the TN cell 205-*b* may fail (e.g., the UE 115-*a* may be unable to receive paging messages 210 via the TN cell 205-*b* and/or the TN cell 205-*b* may be unable to transmit paging messages 210 to the UE 115-*a*). As such, the UE 115-*a* may monitor (e.g., switch to monitoring) the NTN cell 205-*d* for paging messages 210. Additionally, or alternatively (e.g., if the UE 115-*a* moves out of RRC_inactive with respect to the TN cell 205-*b*), the UE 115-*a* may refrain from performing (e.g., does not have to perform) tracking area updates (e.g., as the UE 115-*a* may still be connected to the NTN cell 205-*d* and may be reachable). For example, (e.g., in a high speed scenario, such as a train), the UE 115-*a* may leave (e.g., go off) an inactive mode with respect to the TN cell 205-*b* and may enter (e.g., stay in) an inactive mode with respect to an additional TN cell 205 (e.g., without resume as paging may be handled by the NTN cell 205-*d*).

In some examples, the UE 115-*a* may operate in a connected mode (e.g., connected with the TN cell 205-*b*) and may monitor for paging messages 210. In such cases, the UE may monitor and receive a paging message 210 via the TN cell 205-*b* and may establish a connection with the TN cell 205-*b*. Additionally, or alternatively, the UE 115-*a* may monitor (e.g., and receive) a paging message 210 via the NTN cell 205-*d* (e.g., even after connection establishment with the TN cell 205-*b*). In such cases, the UE 115-*a* may report (e.g., via an uplink message), to the core network 130-*a*, that the UE 115-*a* is monitoring paging messages 210 via the NTN cell 205-*d*.

Though described in the context of TN cells 205 and NTN cells 205, this is not to be regarded as a limitation of the present disclosure. Indeed, it is described herein that the core network 130-*a* may offload paging from the TN cell 205-*a* to the NTN cell 205-*d*. In this regard, any combination of cells 205, including, but not limited to, a first TN cell 205 and a second TN cell 205, a first NTN cell 205 and a second NTN cell 205, a fourth NTN cell 205 associated with a geostationary orbit (GSO) and a fifth NTN cell 205 associated with a non-GSO (NGSO), or a primary cell 205 and a secondary cell 205 (e.g., in carrier aggregation (CA) or duel connectivity (DC)), may be described with reference to the techniques described herein.

Additionally, or alternatively, more than two cells 205 may be considered with regards to the techniques described herein. For example, the UE 115-*a* may monitor one or more cells 205 for paging messages and may establish a connection with one or more cells 205 in accordance with the techniques described herein.

Figure 3:
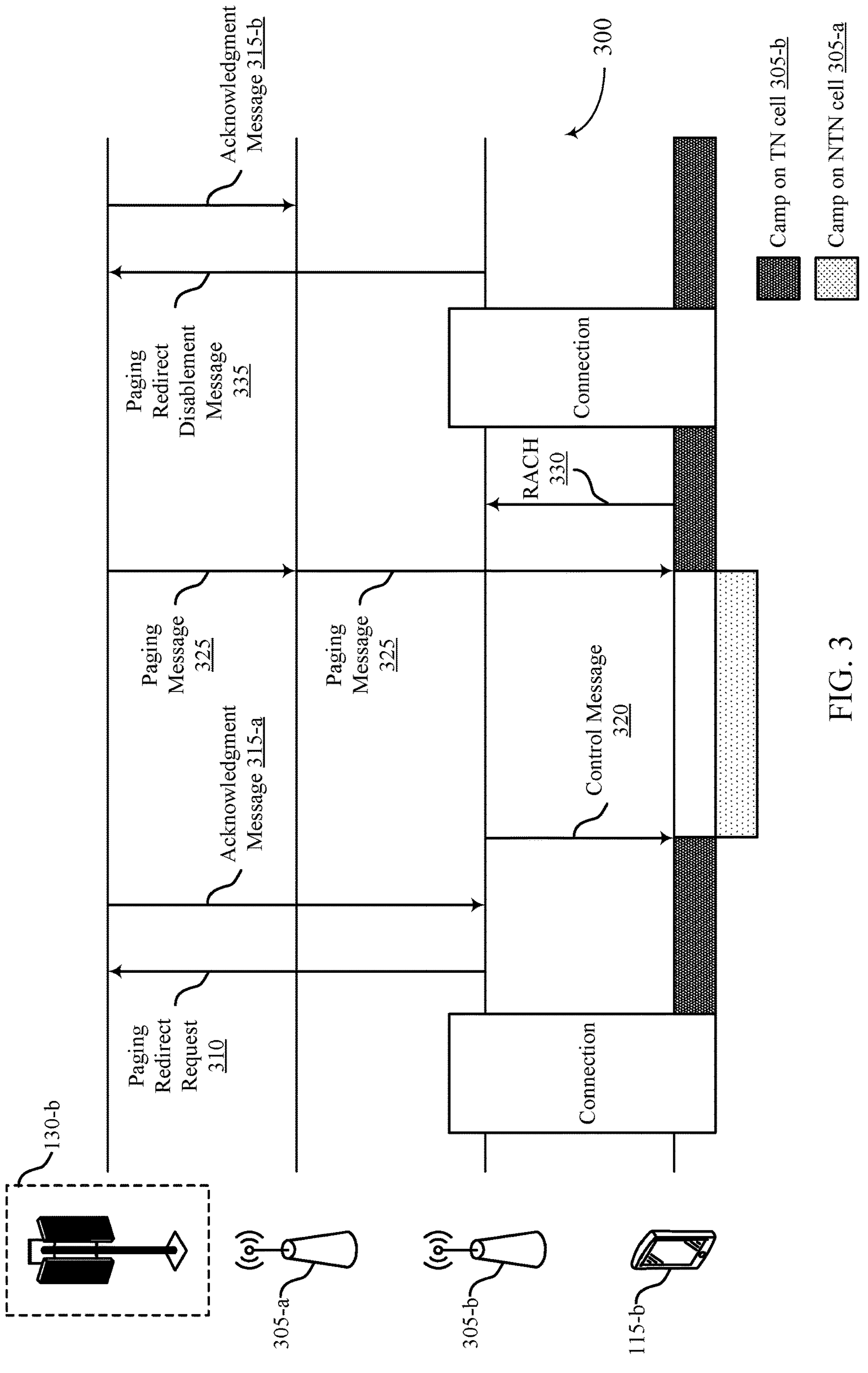
FIG. 3 shows an example of a timing diagram that supports techniques for paging offloading in accordance with one or more aspects of the present disclosure.

FIG. 3 shows an example of a timing diagram 300 that supports techniques for paging offloading in accordance with one or more aspects of the present disclosure. In some examples, the timing diagram 300 may implement or be implemented by aspects of the wireless communications system 100 or the wireless communications system 200. For example, the timing diagram 300 may include one or more core networks (e.g., a core network 130-*b*), one or more network entities 105 (e.g., a cell 305-*a* associated with a first network entity 105 and a cell 305-*b* associated with a second network entity 105) and one or more UEs 115 (e.g., a UE 115-*b*), which may be examples of the corresponding devices as described with reference to FIG. 1.

As described with reference to FIG. 2, the core network 130-*b* (e.g., core network entity) may be associated with multiple network entities 105 associated with multiple cells 305, including a cell 305-*a* associated with a first network entity 105, which made be an NTN cell 305-*a*, and a second network entity associated 105 with the cell 305-*b*, which may be a TN cell 305-*b*. The first network entity 105 may be the same as or different that the second network entity 105. In some examples, the TN cell 305-*b* may be associated with a coverage area that is a portion of a tracking area associated with the UE 115-*b* and the NTN cell 305-*a* may be associated with a coverage area that includes the tracking area associated with the UE 115-*b*.

In some examples, the UE 115-*b* may communicate (e.g., be connected) with the TN cell 305-*b*. In some cases, the UE 115-*b* may enter an idle mode, an inactive mode, or a non-connected mode and may monitor the TN cell 305-*b* for a paging message. Additionally, the second network entity 105 associated with the TN cell 305-*b* may transmit a paging redirect request 310 to the core network 130-*b*, requesting that the core network 130-*b* transmit paging messages 325 via the first network entity 105 associated with the NTN cell 305-*a*. In other words, the paging redirect request 310 may request for the core network 130-*b* to switch paging via the second network entity 105 associated with the TN cell 305-*b* to another network entity 105 associated with another cell 305, such as the first network entity 105 associated with the NTN cell 305-*a* (e.g., request for the core network 130-*b* to offload paging from the second network entity 105 associated with the TN cell 305-*b*). The core network 130-*b* may transmit an acknowledgment message 315-*a* to the second network entity 105 associated with the TN cell 305-*b* based on receiving the paging redirect request 310. That is, the acknowledgment message 315-*a* may indicate that the core network 130-*b* accepted the request to offload paging from the second network entity 105 associated with the TN cell 305-*b*.

As such, the TN cell 305-*b* may transmit a control message 320 (e.g., during RRC configuration, RRC reconfiguration, or RRC connection release/suspension procedures) to the UE 115-*b* indicating one or more parameters for selecting one or more cells 305 to monitor for a paging message 225, for selecting one or more cells 305 for connection establishment, or both. That is, the one or more parameters may include a first subset of the one or more parameters for selecting one or more cells 305, such as the NTN cell 305-*a*, to monitor for a paging message 225, a second subset of the one or more parameters for selecting one or more cells 305, such as the TN cell 305-*b*, for connection establishment, or both. In some examples, the second network entity 105 associated with the TN cell 305-*b* may communicate (e.g., coordinate) with the core network 130-*b* to determine one or more network entities 105, such as the first network entity 105 associated with the NTN cell 305-*a*, for transmitting paging messages 325 and, in some examples, may indicate the one or more determine network entities 105 (e.g., the first network entity 105 associated with the NTN cell 305-*a*) to the second network entity 105 associated with the TN cell 305-*b*, such that the TN cell 305-*b* may indicate the one or more parameters (e.g., the first subset of the one or more parameters) associated with the TN cell 305-*b*.

In some examples, the control message 320 may be referred to as a paging offloading configuration message 320 or a connection release message 320. Additionally, or alternatively, the one or more parameters may indicate frequency information (e.g., frequency band, priority, etc.), RAT information (e.g., LTE, NR, 6G, etc.), network information (e.g., TN, NTN, orbit information, such as GSO, NGSO, high altitude platform station (HAPS)), tracking area (TA) information, one or more cell identifiers (e.g., a cell identifier list), one or more public land mobile network (PLMN) identifiers, one or more slicing identifiers, a type of core network, or any combination thereof. In some examples, the one or more parameters may indicate restricted information. For example, the one or more parameters may indicate one or more frequencies (e.g., combinations of a frequency associated with the TN cell 305-*b* and a frequency associated with the NTN cell 305-*a*), one or more bandwidths, or the like thereof, that the UE 115-*b* may (e.g., should) refrain from using.

In some examples, the one or more parameters (e.g., configuration) may be associated with a validity period (e.g., a duration for which the one or more parameters may be applied). That is, the UE 115-*b* may release (e.g., implicitly) the one or more parameters (e.g., configuration) indicated via the control message 320 based on failing to receive a paging message 225 or failing to establish a connection with the TN cell 305-*b* (e.g., or failing to resume communications with the TN cell 305-*b*) within the validity period. Releasing the one or more parameters based on the validity period may result in UE 115-*b* batter saving, internal memory saving, or both. The one or more parameters may indicate the validity period (e.g., duration) associated with the one or more parameters.

In some examples, the one or more parameters may be based on a capability of the UE 115-*b*. That is, the UE 115-*b* may transmit a capability message (e.g., report) indicating a capability of the UE 115-*b* to support paging offloading (e.g., support selection of one or more cells 305 to monitor for a paging message 225, for selecting one or more cells 305 for connection establishment, or both). In some examples, the capability message may indicate one or more support frequency bands, one or more supported frequency band combinations, one or more supported RATs, one or more supported types of core networks 130, one or more supported types of cells 305 (e.g., NTN cell 305, TN cell 305, orbit of an NTN cell 305), a battery status (e.g., level) of the UE 115-*b*, a quantity of supported cells 305 (e.g., cells 305 that can be configured for paging reception), or any combination thereof.

The UE 115-*b* may release monitoring of one or more paging messages 325 via the TN cell 305-*b* (e.g., may stop camping on the TN cell 305-*b*) and may monitor the NTN cell 305-*a* for one or more paging messages 325 (e.g., camp on the NTN cell 305-*a*) based on receiving the control message 320. In some examples, the UE 115-*b* may be unable to detect the NTN cell 305-*a* (e.g., detect an available NTN cell 305) and may transmit, to the TN cell 305-*b*, an indication that the UE 115-*b* failed to detect the NTN cell 305-*a*. In such cases, the second network entity 105 associated with the TN cell 305-*b* may refrain from releasing paging (e.g., give up paging offloading) to the NTN cell 305-*a* and may transmit, to the core network 130-*b*, an indication that the second network entity 105 associated with the TN 305-*b* refrained from releasing paging. Additionally, or alternatively, the UE 115-*b* may monitor (e.g., camp on) an additional cell 305 (e.g., NTN cell 305, TN cell 305, etc.) for paging messages 325 (e.g., and the core network 130-*b* may handle paging accordingly). For example, the core network 130-*b* may transmit a paging message 325 via the second network entity 105 associated with the TN cell 305-*b* based on failing to receive a paging response (e.g., from the UE 115-*b*) within a duration of transmitting the paging message 325.

In some examples, as depicted in FIG. 3, the core network 130-*b* may transmit a paging message 325 to the first network entity 105 associated with the NTN cell 305-*a* and the NTN cell 305-*a* may forward (e.g., transmit) the paging message 325 to the UE 115-*b*. In some examples, the UE 115-*b* may receive the paging message 325 and may attempt to detect (e.g., search for or camp on) a cell 305, such as the TN cell 305-*b*, based on receiving the paging message 325. In some examples, the TN cell 305-*b*. In some cases, the paging message 325 may indicate whether the UE 115-*b* may (e.g., should) search for the TN cell 305-*b* (e.g., or if the UE 115-*b* should establish a connection with the NTN cell 305-*a*). That is, the paging message 325 may indicate whether the UE 115-*b* may select (e.g., search for) one or more cells 305 based on the one or more parameters in the control message 320, based on an indication of one or more cells 305 (e.g., the TN cell 305-*b*) indicated via the paging message 225 (e.g., as selected by the core network 130-*b*), based on one or more second parameters associated with the UE 115-*b* (e.g., based on UE 115-*b* implementation), or any combination thereof. In some examples, the information associated with the UE 115-*b* selecting the one or more cells 305 may be included in the paging message 325 or may be multiplexed with the paging message 325 (e.g., in RRC, MAC, or L1).

In some cases, the UE 115-*b* may detect the TN cell 305-*b* and may transmit a RACH message 330 to establish a connection with the TN cell 305-*b* (e.g., based on receiving the paging message 325 or based on uplink transmission with the TN cell 305-*b* resuming). In other words, the RACH message 330 may initiate a connection establishment procedure (e.g., RACH procedure) with the TN cell 305-*b*. The UE 115-*b* may establish the connection with the TN cell 305-*b* and the second network entity 105 associated with the TN cell 305-*b* may transmit a paging redirect disablement message 335 indicating that the second network entity 105 associated with the TN cell 305-*b* successfully established the connection with the UE 115-*b*. In other words, the paging redirect disablement message 335 may indicate (e.g., request) for the core network 130-*b* to disable paging offloading via the first network entity 105 associated with the NTN cell 305-*a* (e.g., refrain from sending paging messages 325 via the first network entity 105 associated with the NTN cell 305-*a*). The core network 130-*b* may transmit an acknowledgment message 315-*b* in response to the paging redirect disablement message 335. That is, the acknowledgment message 315-*b* may indicate that the core network 130-*b* disabled paging offloading via the first network entity 105 associated with the NTN cell 305-*a* (e.g., will refrain from sending paging messages 325 via first network entity 105 associated with the NTN cell 305-*a*).

In some other examples, the UE 115-*b* may fail to detect the TN cell 305-*b*. In such cases, the UE 115-*b* may transmit the RACH message 330 to the NTN cell 305-*a* to establish the connection with the NTN cell 305-*a* (e.g., to trigger connection establishment on the NTN cell 305-*a*). In some examples, the UE 115-*b* may trigger connection establishment with the NTN cell 305-*a* based on failing to detect the TN cell 305-*b* within a threshold duration. In some examples, the core network 130-*b* may indicate (e.g., via a cell 305) the threshold duration (e.g., in the control message 320). The UE 115-*b* may transmit a feedback message to the core network 130-*b* (e.g., via the first network entity 105 associated with the NTN cell 305-*a*) based on failing to detect the TN cell 305-*b*.

Figure 4:
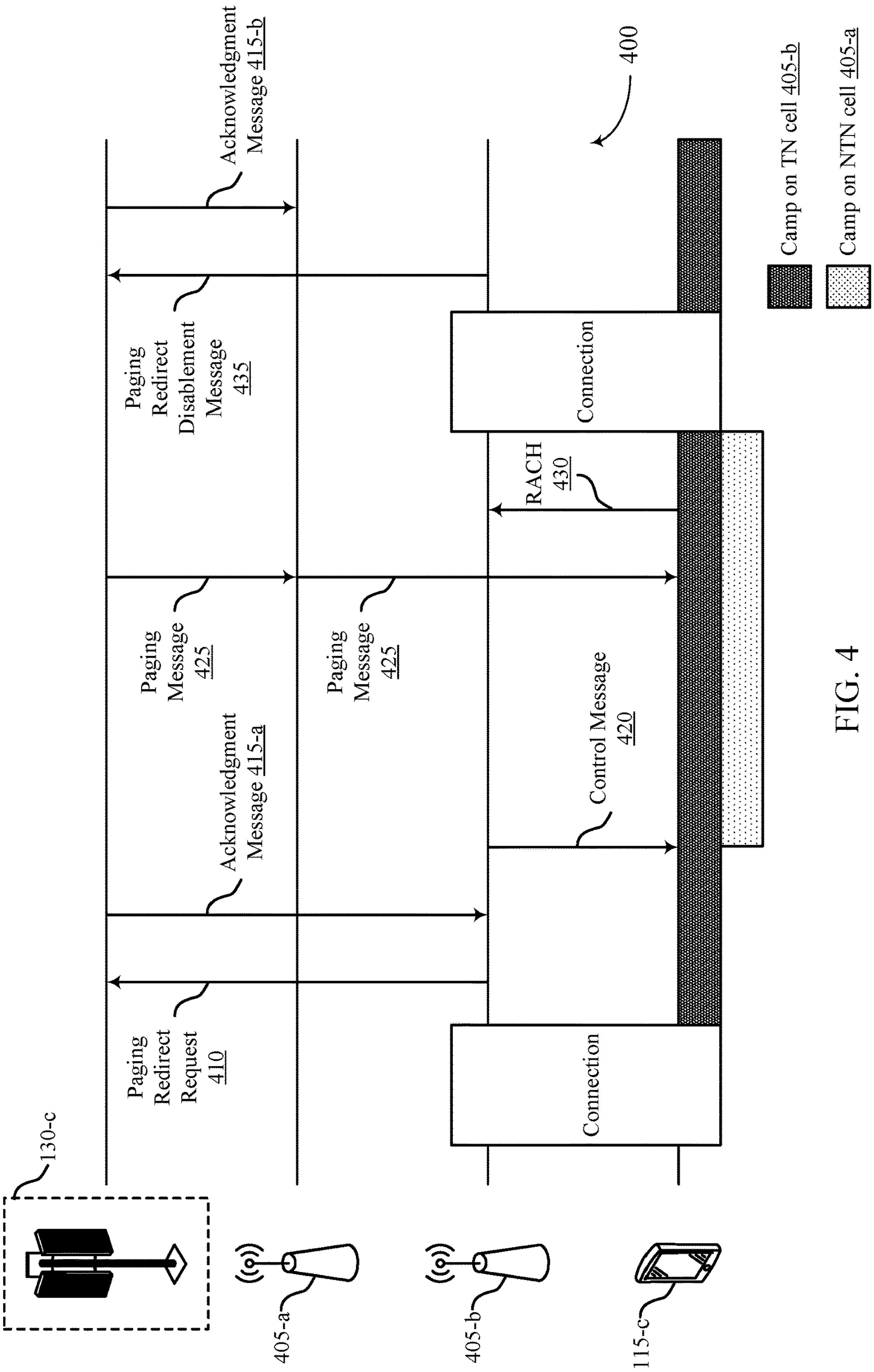
FIG. 4 shows an example of a timing diagram that supports techniques for paging offloading in accordance with one or more aspects of the present disclosure.

FIG. 4 shows an example of a timing diagram 400 that supports techniques for paging offloading in accordance with one or more aspects of the present disclosure. In some examples, the timing diagram 400 may implement or be implemented by aspects of the wireless communications system 100, the wireless communications system 200, or the timing diagram 300. For example, the timing diagram 400 may include one or more core networks (e.g., a core network 130-*c*), one or more network entities 105 (e.g., a cell 405-*a* associated with a first network entity 105 and a cell 405-*b* associated with a second network entity 105) and one or more UEs 115 (e.g., a UE 115-*c*), which may be examples of the corresponding devices as described with reference to FIG. 1.

As described with reference to FIG. 2, the core network 130-*c* (e.g., core network entity) may be associated with multiple network entities 105 associated with multiple cells 405, including a cell 405-*a* associated with a first network entity 105, which made be an NTN cell 405-*a*, and a cell 405-*b* associated with a second network entity 105, which may be a TN cell 405-*b*. The first network entity 105 may be the same as or different that the second network entity 105. In some examples, the TN cell 405-*b* may be associated with a coverage area that is a portion of a tracking area associated with the UE 115-*c* and the NTN cell 405-*a* may be associated with a coverage area that includes the tracking area associated with the UE 115-*c*.

In some examples, the UE 115-*c* may communicate (e.g., be connected) with the TN cell 405-*b*. In some cases, the UE 115-*c* may enter an idle mode, an inactive mode, or a non-connected mode and may monitor the TN cell 405-*b* for a paging message. Additionally, the second network entity 105 associated with the TN cell 405-*b* may transmit a paging redirect request 410 to the core network 130-*c*, requesting that the core network 130-*c* transmit paging messages 225 via the first network entity 105 associated with the NTN cell 405-*a*. In other words, the paging redirect request 410 may request for the core network 130-*c* to switch paging via the second network entity 105 associated with the TN cell 405-*b* to another network entity 105 associated with another cell 405, such as the first network entity 105 associated with the NTN cell 405-*a* (e.g., request for the core network 130-*c* to offload paging from the second network entity 105 associated with the TN cell 405-*b*). The core network 130-*c* may transmit an acknowledgment message 415-*a* to the second network entity 105 associated with the TN cell 405-*b* based on receiving the paging redirect request 410. That is, the acknowledgment message 415-*a* may indicate that the core network 130-*c* accepted the request to offload paging from the second network entity 105 associated with the TN cell 405-*b*.

As such, the TN cell 405-*b* may transmit a control message 420 (e.g., during RRC configuration, RRC re-configuration, or RRC connection release/suspension procedures) to the UE 115-*c* indicating one or more parameters for selecting one or more cells 405 to monitor for a paging message 225, for selecting one or more cells 405 for connection establishment, or both. That is, the one or more parameters may include a first subset of the one or more parameters for selecting one or more cells 405, such as the NTN cell 405-*a*, to monitor for a paging message 225, a second subset of the one or more parameters for selecting one or more cells 405, such as the TN cell 405-*b*, for connection establishment, or both. In some examples, the second network entity 105 associated with the TN cell 405-*b* may communicate (e.g., coordinate) with the core network 130-*c* to determine one or more network entities 105, such as the first network entity 105 associated with the NTN cell 405-*a*, for transmitting paging messages 425 and, in some examples, may indicate the one or more determine network entities 105 (e.g., the first network entity 105 associated with the NTN cell 405-*a*) to the second network entity 105 associated with the TN cell 405-*b*, such that the TN cell 405-*b* may indicate the one or more parameters (e.g., the first subset of the one or more parameters) associated with the TN cell 405-*b*.

In some examples, the control message 420 may be referred to as a paging offloading configuration message 420 or a connection release message 420. Additionally, or alternatively, the one or more parameters may indicate frequency information (e.g., frequency band, priority, etc.), RAT information (e.g., LTE, NR, 6G, etc.), network information (e.g., TN, NTN, orbit information, such as GSO, NGSO, high altitude platform station (HAPS)), tracking area (TA) information, one or more cell identifiers (e.g., a cell identifier list), one or more public land mobile network (PLMN) identifiers, one or more slicing identifiers, a type of core network, or any combination thereof. In some examples, the one or more parameters may indicate restricted information. For example, the one or more parameters may indicate one or more frequencies (e.g., combinations of a frequency associated with the TN cell 405-*b* and a frequency associated with the NTN cell 405-*a*), one or more bandwidths, or the like thereof, that the UE 115-*c* may (e.g., should) refrain from using.

In some examples, the one or more parameters (e.g., configuration) may be associated with a validity period (e.g., a duration for which the one or more parameters may be applied). That is, the UE 115-*c* may release (e.g., implicitly) the one or more parameters (e.g., configuration) indicated via the control message 420 based on failing to receive a paging message 225 or failing to establish a connection with the TN cell 405-*b* (e.g., or failing to resume communications with the TN cell 405-*b*) within the validity period. Releasing the one or more parameters based on the validity period may result in UE 115-*c* batter saving, internal memory saving, or both. The one or more parameters may indicate the validity period (e.g., duration) associated with the one or more parameters.

Additionally, or alternatively, the control message 420 may indicate for the UE 115-*c* to monitor (e.g., camp on) the NTN cell 405-*a* or the NTN cell 405-*a* and the TN cell 405-*b*. In some examples, the control message 420 may be applied separately for core network paging and RAN paging (e.g., paging offloading is applied to core network paging and not applied to RAN paging, applied to RAN paging and not to core network paging, applied to both core network paging and RAN paging, etc.). Additionally, or alternatively, the one or more parameters may include a third subset of the one or more parameters associated with the TN cell 405-*b* and a fourth subset of the one or more parameters associated with the NTN cell 405-*a*. For example, one or more paging occasions, DRX information, or both, may be separately configured for the TN cell 405-*b* and the NTN cell 405-*a*. Alternatively, the one or more paging occasions, the DRX information, or both, may be common (e.g., the same) for the TN cell 405-*b* and the NTN cell 405-*a*. The core network 130-*c* may determine whether the third subset of the one or more parameters and the fourth subset of the one or more parameters are the same or different.

In some examples, the one or more parameters may be based on a capability of the UE 115-*c*. That is, the UE 115-*c* may transmit a capability message (e.g., report) indicating a capability of the UE 115-*c* to support paging offloading (e.g., support selection of one or more cells 405 to monitor for a paging message 225, for selecting one or more cells 405 for connection establishment, or both). In some examples, the capability message may indicate one or more support frequency bands, one or more supported frequency band combinations, one or more supported RATs, one or more supported types of core networks 130, one or more supported types of cells 405 (e.g., NTN cell 405, TN cell 405, orbit of an NTN cell 405), a battery status (e.g., level) of the UE 115-*c*, a quantity of supported cells 405 (e.g., cells 405 that can be configured for paging reception), or any combination thereof.

In some examples, the UE 115-*c* may monitor (e.g., camp on) the NTN cell 405-*a* and the TN cell 405-*b*, however, the UE 115-*a* may attempt reception of paging messages 425 via the NTN cell 405-*a*. That is, the UE 115-*c* may monitor the NTN cell 405-*a* for one or more paging messages 425 and may monitor the TN cell 405-*b* for information associated with connection establishment (e.g., master information block(s), system information blocks (SIBs), or both). For example, the UE 115-*c* may acquire (e.g., monitor, receive) information (e.g., required information) associated with establishing a connection with the TN cell 405-*b*, such that the UE 115-*c* may attempt to establish a connection with the TN cell 405-*b* without searching for the TN cell 405-*b*.

In some other examples, the UE 115-*c* may monitor both the NTN cell 405-*a* and the TN cell 405-*b* for paging messages 425. That is, the UE 115-*c* may attempt reception of paging messages 425 via the NTN cell 405-*a* and the TN cell 405-*b*. In such cases, the core network 130-*c* may determine whether to transmit a paging message 425 via the first network entity 105 associated with the NTN cell 405-*a*, the second network entity 105 associated with the TN cell 405-*b*, or both.

In some examples, the UE 115-*c* may be unable to detect the NTN cell 405-*a* (e.g., detect an available NTN cell 405) and may transmit, to the TN cell 405-*b*, an indication that the UE 115-*c* failed to detect the NTN cell 405-*a*. In such cases, the second network entity 105 associated with the TN cell 405-*b* may refrain from releasing paging (e.g., give up paging offloading) to the NTN cell 405-*a* and may transmit, to the core network 130-*c*, an indication that the TN 405-*b* refrained from releasing paging. Additionally, or alternatively, the UE 115-*c* may monitor (e.g., camp on) an additional cell 405 (e.g., NTN cell 405, TN cell 405, etc.) for paging messages 425 (e.g., and the core network 130-*c* may handle paging accordingly). For example, the core network 130-*c* may transmit a paging message 425 via the second network entity 105 associated with the TN cell 405-*b* based on failing to receive a paging response (e.g., from the UE 115-*c*) within a duration of transmitting the paging message 425. In some examples, the UE 115-*c* (e.g., and the core network 130-*c*) may perform cell selection or re-selection for the TN cell 405-*b* and the NTN cell 405-*a*.

In some examples, as depicted in FIG. 4, the core network 130-*c* may transmit a first paging message 425 to the first network entity 105 associated with the NTN cell 405-*a* and the NTN cell 405-*a* may forward (e.g., transmit) the first paging message 425 to the UE 115-*c*. In some cases, the UE 115-*c* may receive the first paging message 425 may refrain from monitoring for additional paging messages 425 (e.g . . . stop paging reception) via the NTN cell 405-*a*. Additionally, the UE 115-*c* may attempt to receive one or more additional paging messages 425 via the TN cell 405-*b* (e.g., for system information updates).

Additionally, or alternatively (e.g., when the UE 115-*c* monitors the TN cell 405-*b* and the NTN cell 405-*a* for paging reception), the core network 130-*c* may transmit a second paging message 425 to the second network entity 105 associated with the TN cell 405-*b* and the TN cell 405-*b* may forward (e.g., transmit) the second paging message 425 to the UE 115-*c*. In some examples, the UE 115-*c* may receive the first paging message 425 via the NTN cell 405-*a* and the second paging message 425 via the TN cell 405-*b*. In such cases, the UE 115-*c* may process one or more of the first paging message 425 and the second paging message 425. In some examples, the UE 115-*c* may process one of the first paging message 425 and the second paging message 425 and may determine which paging message 425 to process based on one or more prioritization rules. For example, a first prioritization rule may indicate for the UE 115-*c* to process paging message 425 received via TN cells 405 over paging messages 425 received via NTN cells 405 (e.g., or visa-versa). A second prioritization rule may indicate for the UE 115-*c* to process paging messages 425 associated with CN paging over paging messages 425 associated with RAN paging (e.g., or visa-versa). A third prioritization rule may indicate for the UE 115-*c* to process paging messages 425 transmitted via NR over paging messages 425 transmitted via LTE (e.g., or visa-versa). A fourth prioritization rule may indicate a first in first out (FIFO) rule in which a first receive paging message 425 (e.g., or a paging message 425 associated with an earlier sequence number) is to be processed by the UE 115-*c*. The one or more prioritization rules (e.g., first prioritization rule, second prioritization rule, third prioritization rule, fourth prioritization rule, or any combination thereof) may be indicated to the UE 115-*c* by the core network 130-*c* (e.g., via a cell 405).

In some cases, the one or more paging messages 425 may indicate whether the UE 115-*c* may (e.g., should) establish a connection with the TN cell 405-*b* (e.g., or if the UE 115-*c* should establish a connection with the NTN cell 405-*a*). That is, the one or more paging messages 425 may indicate whether the UE 115-*c* may select (e.g., search for) one or more cells 405 based on the one or more parameters in the control message 220, based on an indication of one or more cells 405 (e.g., the TN cell 405-*b*) indicated via the paging message 225 (e.g., as selected by the core network 130-*c*), based on one or more second parameters associated with the UE 115-*c* (e.g., based on UE 115-*c* implementation), or any combination thereof. In some examples, the information associated with the UE 115-*c* selecting the one or more cells 405 may be included in the one or more paging messages 425 or may be multiplexed with the one or more paging messages 425 (e.g., in RRC, MAC, or L1).

In some cases, the UE 115-*c* may transmit a RACH message 430 to establish a connection with the TN cell 405-*b* (e.g., based on receiving the one or more paging messages 425 or based on uplink transmission with the TN cell 405-*b* resuming). In other words, the RACH message 430 may initiate a connection establishment procedure (e.g., RACH procedure) with the TN cell 405-*b*. The UE 115-*c* may establish the connection with the TN cell 405-*b* and the second network entity 105 associated with the TN cell 405-*b* may transmit a paging redirect disablement message 435 indicating that the second network entity 105 associated with the TN cell 405-*b* successfully established the connection with the UE 115-*c*. In other words, the paging redirect disablement message 435 may indicate (e.g., request) for the core network 130-*c* to disable paging offloading via the first network entity 105 associated with the NTN cell 405-*a* (e.g., refrain from sending paging messages 425 via the second network entity 105 associated with the NTN cell 405-*a*). The core network 130-*c* may transmit an acknowledgment message 415-*b* in response to the paging redirect disablement message 435. That is, the acknowledgment message 415-*b* may indicate that the core network 130-*c* disables paging offloading via the first network entity 105 associated with the NTN cell 405-*a* (e.g., will refrain from sending paging messages 425 via the first network entity 105 associated with the NTN cell 405-*a*).

In some other examples, the UE 115-*c* may fail to establish the connection with the TN cell 405-*b*. In such cases, the UE 115-*c* may transmit the RACH message 430 to the NTN cell 405-*a* to establish the connection with the NTN cell 405-*a* (e.g., to trigger connection establishment on the NTN cell 405-*a*). In some examples, the UE 115-*c* may trigger connection establishment with the NTN cell 405-*a* based on failing to detect the TN cell 405-*b* within a threshold duration. In some examples, the core network 130-*c* may indicate (e.g., via a cell 405) the threshold duration (e.g., in the control message 420). The UE 115-*c* may transmit a feedback message to the core network 130-*c* (e.g., via the NTN cell 405-*a*) based on failing to detect the TN cell 405-*b*.

Figure 5:
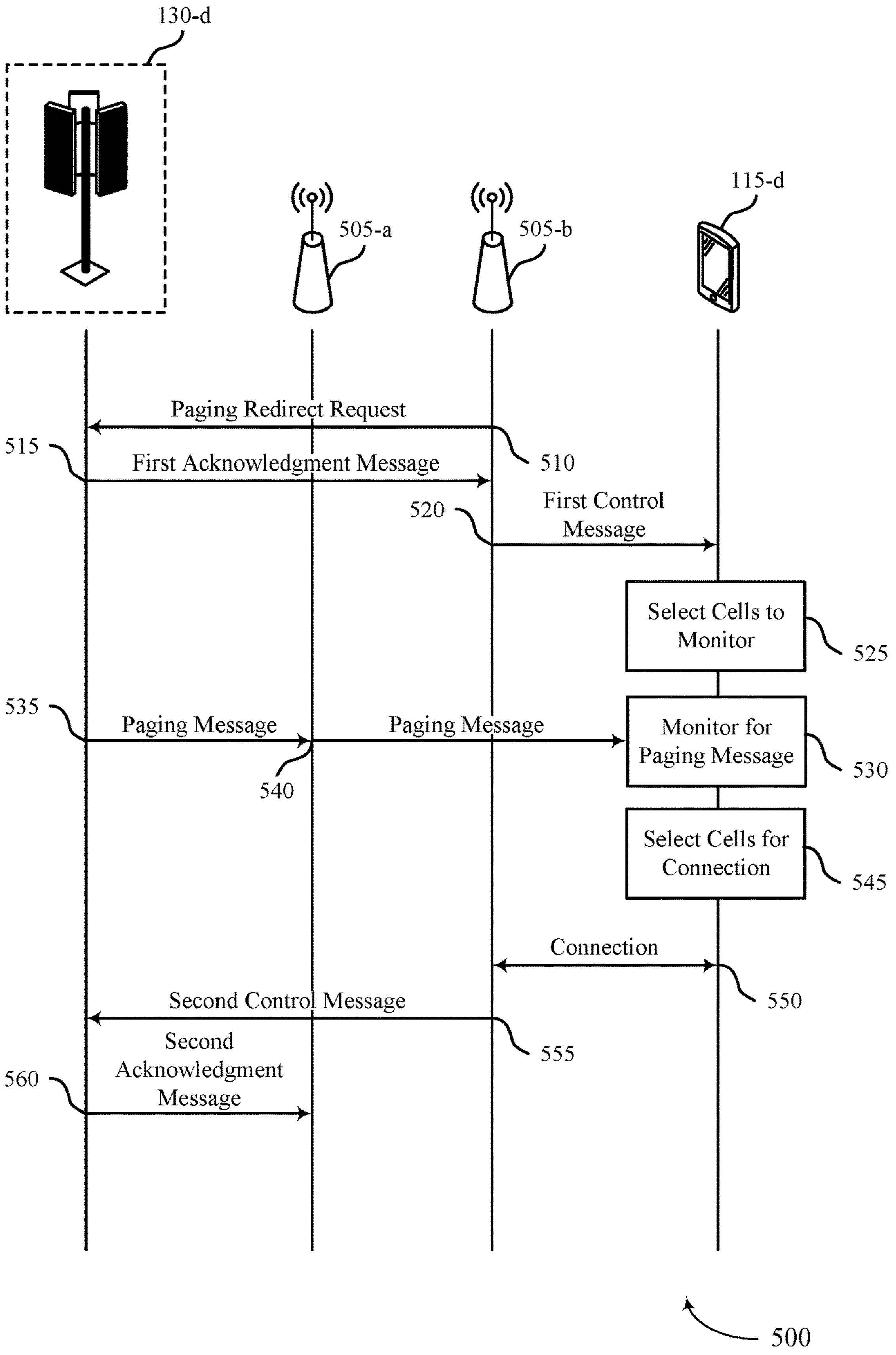
FIG. 5 shows an example of a process flow that supports techniques for paging offloading in accordance with one or more aspects of the present disclosure.

FIG. 5 shows an example of a process flow 500 that supports techniques for paging offloading in accordance with one or more aspects of the present disclosure. In some examples, the process flow 500 may implement or be implemented by aspects of the wireless communications system 100, the wireless communications system 200, the timing diagram 300, or the timing diagram 400. For example, the process flow 500 may include one or more core networks (e.g., a core network 130-*d*), one or more network entities 105 (e.g., a cell 505-*a* and a cell 505-*b*) and one or more UEs 115 (e.g., a UE 115-*d*), which may be examples of the corresponding devices as described with reference to FIG. 1. In some examples, the cell 505-*a* may be an NTN cell 505-*a* and the cell 505-*b* may be a TN cell 505-*b*.

At 510, the core network 130-*d* (e.g., core network entity) may receive (e.g., from a network entity 105 associated with the cell 505-*b*) a paging redirect request (e.g., control message) requesting the core network 130-*d* to transmit paging messages via an additional network entity 105 associated with an additional cell 505 (e.g., via a network entity 105 associated with the cell 505-*a*).

At 515, the core network 130-*d* may transmit a first acknowledgment message responsive to the paging redirect request.

At 520, the UE 115-*d* may receive a first control message indicating one or more parameters associated with selecting one or more cells 505 (e.g., to monitor for a paging message, to establish a connection, or both). In some cases, the one or more parameters may indicate frequency information, RAT information, network information, tracking area information, one or more cell 505 identifiers, one or more public land mobile network identifiers, one or more slicing identifiers, a type of core network, a duration associated with monitoring the one or more first cells 505, or any combination thereof.

In some examples, the one or more parameters may be based on a capability of the UE 115-*d*. That is, the UE 115-*d* may transmit a capability message indicating a capability of the UE 115-*d* to support at least selection of the one or more first cells 505 for paging monitoring or selection of the one or more first cells 505 or the second cell 505 for connection establishment. The capability message may indicate one or more supported frequency bands, one or more supported RATs, one or more supported types of networks, one or more supported types of core networks 130, a battery status of the UE 115-*d*, a quantity of supported cells 505, or any combination thereof.

In some examples, the UE 115-*d* may receive the first control message from one of one or more first cells 505 (e.g., the cell 505-*a* or the cell 505-*a* and the cell 505-*b*) or from a second cell 505 (e.g., the cell 505-*b*). In some cases (e.g., the UE 115-*d* camps on the NTN cell 505-*a*), the one or more first cells 505 may include a first cell 505 associated with an NTN (e.g., the cell 505-*a*) and the second cell 505 may be associated with a TN (e.g., the cell 505-*b*). Alternatively (e.g., the UE 115-*d* camps on the NTN cell 505-*a* and the TN cell 505-*b*), the one or more first cells 505 may include the first cell 505 associated with the NTN (e.g., the cell 505-*a*) and a first cell 505 associated with a TN (e.g., the cell 505-*a*).

At 525, the UE 115-*c* may select one or more first cells 505 (e.g., the cell 505-*a* or the cell 505-*a* and the cell 505-*b*) to monitor for a paging message based on the one or more parameters.

At 530, the UE 115-*d* may monitor the one or more first cells 505 for the paging message in an idle mode, inactive mode, or any non-connected mode based on the selection. In some examples, the UE 115-*d* may stop monitoring of the one or more first cells 505 based on expiration of a timer, where a duration of the timer is based on the duration indicated via the first control message. In some examples, the UE 115-*d* may select the one of the one or more first cells 505 to receive the paging message based on failing to detect the second cell 505. In such cases, the UE 115-*d* may transmit a failure message based on failing to detect the second cell 505 or a third cell 505 (e.g., an additional suitable cell 505).

At 535, the core network 130-*d* may transmit a paging message via one or more network entities 105 associated with the one or more first cells 505 (e.g., the cell 505-*a*, the cell 505-*b*, or both) based on transmitting the first acknowledgment message. In some examples, the core network 130-*d* may transmit the paging message via the one or more network entities 105 associated with the one or more first cells 505 based on receiving the failure message from the UE 115-*d*. In some examples, the one or more first cells 505 may forward the paging message to the UE 115-*d*.

In some examples, at 540, the UE 115-*d* may receive the paging message from each of the one or more first cells (e.g., the cell 505-*a* and the cell 505-*b*) or from one of the one or more first cells 505 (e.g., the cell 505-*a*, as depicted in FIG. 5).

At 545, the UE 115-*d* may select one of the one or more first cells 505 (e.g., the cell 505-*a* or the cell 505-*a* and the cell 505-*b*) or the second cell 505 (e.g., the cell 505-*b*) to establish a connection based on monitoring for the paging message. In some examples, the UE 115-*d* may select the one of the one or more first cells 505 or the second cell 505 based on the one or more parameters. Additionally, or alternatively, the UE 115-*d* may select the one of the one or more first cells 505 or the second cell 505 based on one or more conditions at the UE 115-*d* (e.g., based on UE implementation).

At 550, the UE 115-*d* may establish a connection with the one of the one or more first cells 505 or the second cell 505 based on the second selection. In some examples, the UE 115-*d* may establish the connection with the one of the one or more first cells 505 (e.g., the cell 505-*a*) based on failing to detect the second cell 505 (e.g., 505-*b*).

In some examples, at 555, the core network 130-*d* may receive a second control message indicating the UE 115-*d* established the connection with the one of the one or more first cells 505 (e.g., a network entity 105 associated with a first cell 505) or the second cell 505 (e.g., a network entity 105 associated with the second cell 505).

In some examples, at 560, the core network 130-*d* may transmit a second acknowledgment message responsive to receiving the second control message.

Figure 6:
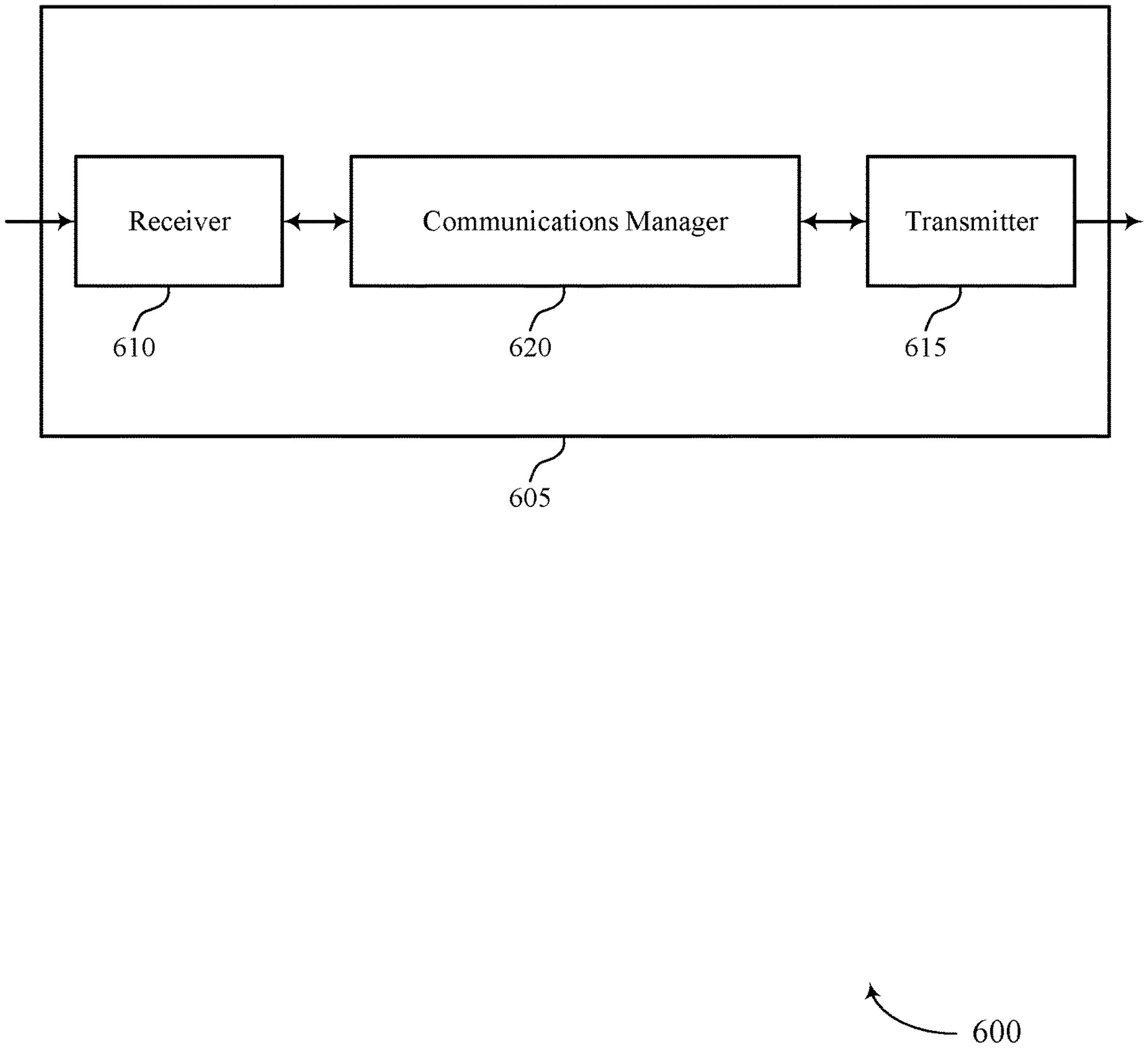
FIGS. 6 and 7 show block diagrams of devices that support techniques for paging offloading in accordance with one or more aspects of the present disclosure.

FIG. 6 shows a block diagram 600 of a device 605 that supports techniques for paging offloading in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for paging offloading). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for paging offloading). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for paging offloading as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and a memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for receiving a control message indicating one or more parameters associated with selecting one or more cells. The communications manager 620 may be configured as or otherwise support a means for selecting one or more first cells to monitor for a paging message based on the one or more parameters. The communications manager 620 may be configured as or otherwise support a means for monitoring the one or more first cells for the paging message in an idle mode, inactive mode, or any non-connected mode based on the selection. The communications manager 620 may be configured as or otherwise support a means for selecting one of the one or more first cells or a second cell to establish a connection based on monitoring for the paging message. The communications manager 620 may be configured as or otherwise support a means for establishing the connection with the one of the one or more first cells or the second cell based on the second selection.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for paging offloading which may result in reduced processing, reduced power consumption, and more efficient utilization of communication resources, among other advantages.

Figure 7:
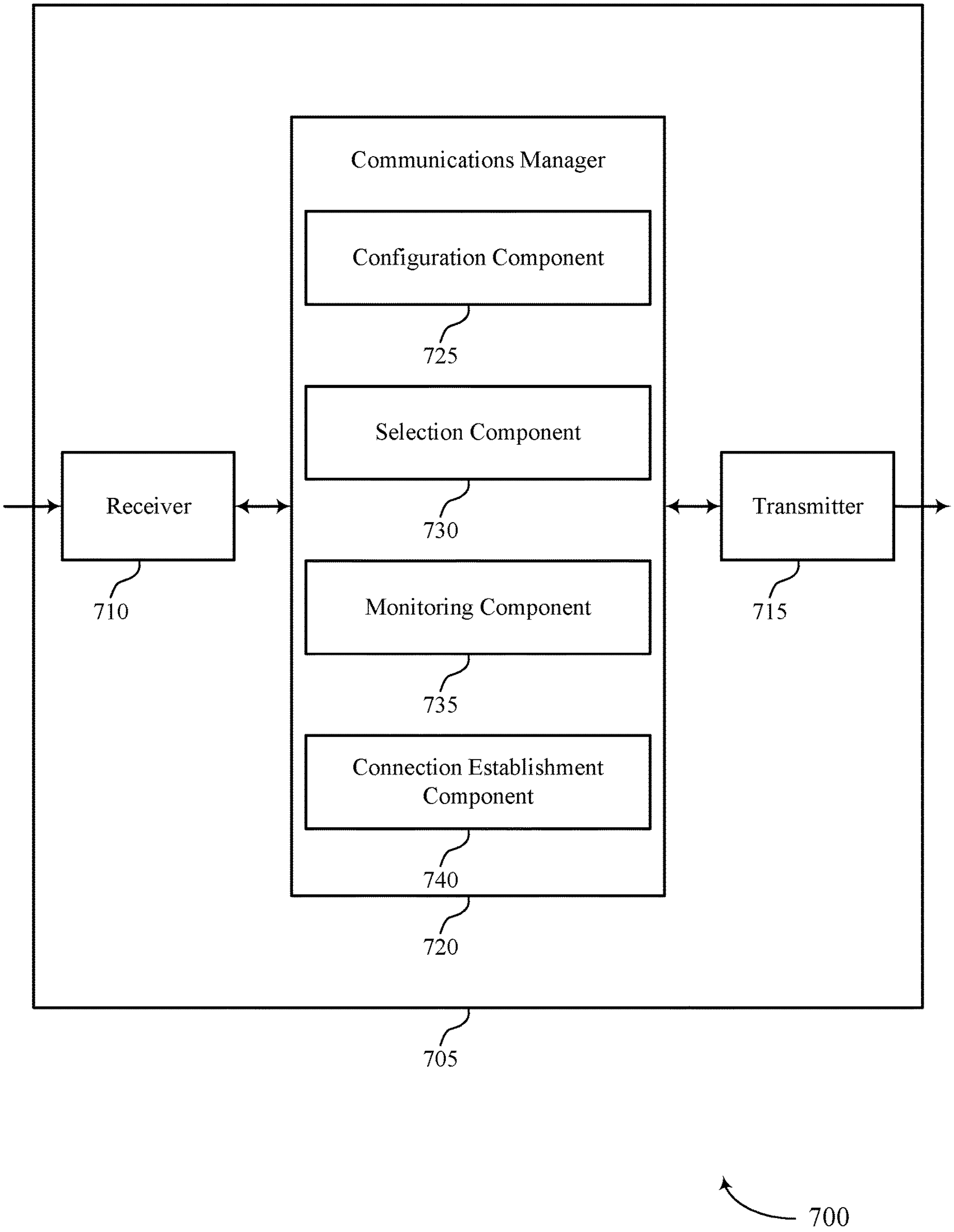

FIG. 7 shows a block diagram 700 of a device 705 that supports techniques for paging offloading in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for paging offloading). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for paging offloading). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for paging offloading as described herein. For example, the communications manager 720 may include a configuration component 725, a selection component 730, a monitoring component 735, a connection establishment component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The configuration component 725 may be configured as or otherwise support a means for receiving a control message indicating one or more parameters associated with selecting one or more cells. The selection component 730 may be configured as or otherwise support a means for selecting one or more first cells to monitor for a paging message based on the one or more parameters. The monitoring component 735 may be configured as or otherwise support a means for monitoring the one or more first cells for the paging message in an idle mode, inactive mode, or any non-connected mode based on the selection. The selection component 730 may be configured as or otherwise support a means for selecting one of the one or more first cells or a second cell to establish a connection based on monitoring for the paging message. The connection establishment component 740 may be configured as or otherwise support a means for establishing the connection with the one of the one or more first cells or the second cell based on the second selection.

Figure 8:
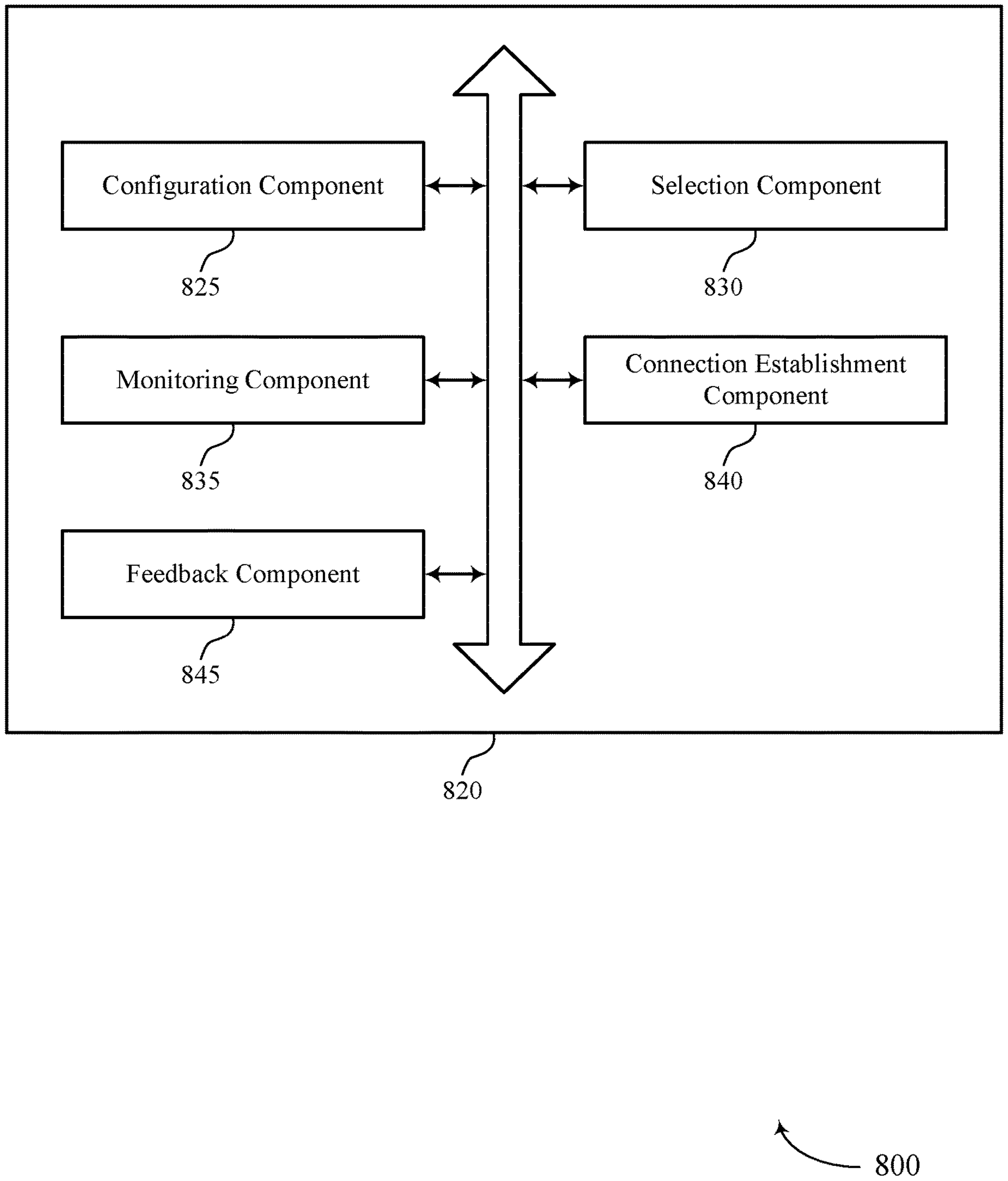
FIG. 8 shows a block diagram of a communications manager that supports techniques for paging offloading in accordance with one or more aspects of the present disclosure.

FIG. 8 shows a block diagram 800 of a communications manager 820 that supports techniques for paging offloading in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for paging offloading as described herein. For example, the communications manager 820 may include a configuration component 825, a selection component 830, a monitoring component 835, a connection establishment component 840, a feedback component 845, or any combination thereof. Each of these components may communicate, directly or indirectly, with one another (e.g., via one or more buses).

The configuration component 825 may be configured as or otherwise support a means for receiving a control message indicating one or more parameters associated with selecting one or more cells. The selection component 830 may be configured as or otherwise support a means for selecting one or more first cells to monitor for a paging message based on the one or more parameters. The monitoring component 835 may be configured as or otherwise support a means for monitoring the one or more first cells for the paging message in an idle mode, inactive mode, or any non-connected mode based on the selection. In some examples, the selection component 830 may be configured as or otherwise support a means for selecting one of the one or more first cells or a second cell to establish a connection based on monitoring for the paging message. The connection establishment component 840 may be configured as or otherwise support a means for establishing the connection with the one of the one or more first cells or the second cell based on the second selection.

In some examples, selecting the one of the one or more first cells or the second cell is based on the one or more parameters.

In some examples, selecting the one of the one or more first cells or the second cell is based on one or more conditions at the UE.

In some examples, the control message is received from one of the one or more first cells or the second cell.

In some examples, the one or more first cells includes at least a first cell associated with a NTN and. In some examples, the second cell is associated with a TN.

In some examples, the one or more first cells includes at least a first cell associated with a NTN and a first cell associated with TN.

In some examples, the one or more parameters indicate frequency information, RAT information, network information, tracking area information, one or more cell identifiers, one or more PLMN identifiers, one or more slicing identifiers, a type of core network, a duration associated with monitoring the one or more first cells, or any combination thereof.

In some examples, the monitoring component 835 may be configured as or otherwise support a means for stopping monitoring of the one or more first cells based on expiration of a timer, where a duration of the timer is based on the indicated duration.

In some examples, the feedback component 845 may be configured as or otherwise support a means for transmitting a capability message indicating a capability of the UE to support at least selection of the one or more first cells for paging monitoring or selection of the one of the one or more first cells or the second cell for connection establishment.

In some examples, the capability message includes an indication of one or more supported frequency bands, one or more supported RATs, one or more supported types of networks, one or more supported types of core networks, a battery status of the UE, a quantity of supported cells, or any combination thereof.

In some examples, the monitoring component 835 may be configured as or otherwise support a means for receiving the paging message from each of the one or more first cells.

In some examples, the monitoring component 835 may be configured as or otherwise support a means for receiving the paging message from one of the one or more first cells.

In some examples, the selection component 830 may be configured as or otherwise support a means for selecting the one or more first cells to receive the paging message based on failing to detect the second cell.

In some examples, the feedback component 845 may be configured as or otherwise support a means for transmitting a failure message based on failing to detect the second cell or a third cell.

In some examples, the second cell is a first available cell associated with an NTN and the third cell is a second available cell associated with the NTN.

In some examples, to support establishing the connection, the connection establishment component 840 may be configured as or otherwise support a means for establishing the connection with the one of the one or more first cells based on failing to detect the second cell or establishing the connection with the second cell.

In some examples, the paging message indicates a group identifier associated with a group including at least the UE.

In some examples, the group identifier includes a P-RNTI.

In some examples, the monitoring component 835 may be configured as or otherwise support a means for receiving a second control message indicating an occasion for transmission of the paging message.

In some examples, the second control message indicates an identifier associated with the UE.

Figure 9:
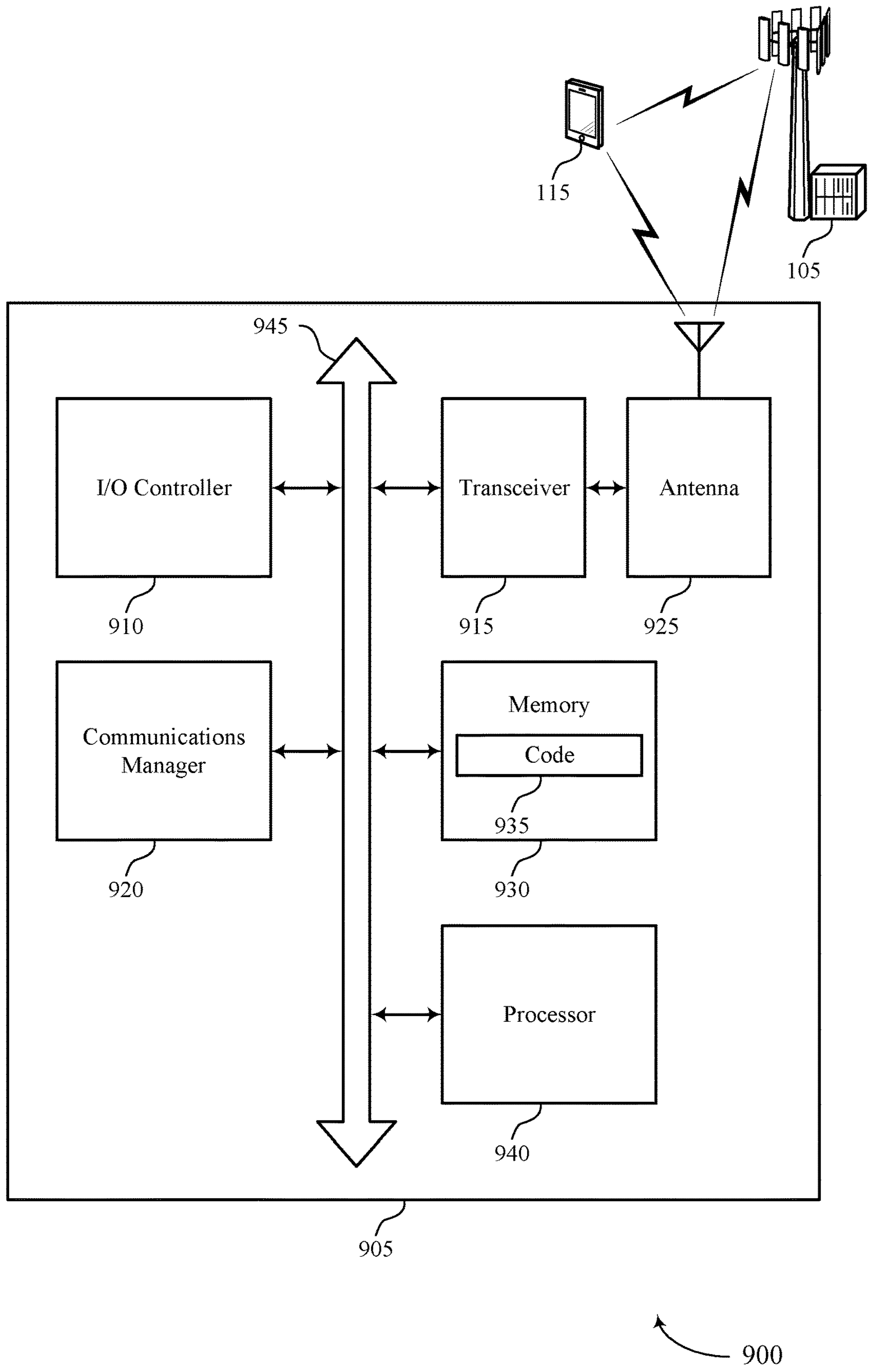
FIG. 9 shows a diagram of a system including a device that supports techniques for paging offloading in accordance with one or more aspects of the present disclosure.

FIG. 9 shows a diagram of a system 900 including a device 905 that supports techniques for paging offloading in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for paging offloading). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for receiving a control message indicating one or more parameters associated with selecting one or more cells. The communications manager 920 may be configured as or otherwise support a means for selecting one or more first cells to monitor for a paging message based on the one or more parameters. The communications manager 920 may be configured as or otherwise support a means for monitoring the one or more first cells for the paging message in an idle mode, inactive mode, or any non-connected mode based on the selection. The communications manager 920 may be configured as or otherwise support a means for selecting one of the one or more first cells or a second cell to establish a connection based on monitoring for the paging message. The communications manager 920 may be configured as or otherwise support a means for establishing the connection with the one of the one or more first cells or the second cell based on the second selection.

By including or configuring the communications manager 920 in accordance with examples as described herein, the device 905 may support techniques for paging offloading which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for paging offloading as described herein, or the processor 940 and the memory 930 may be otherwise configured to perform or support such operations.

Figure 10:
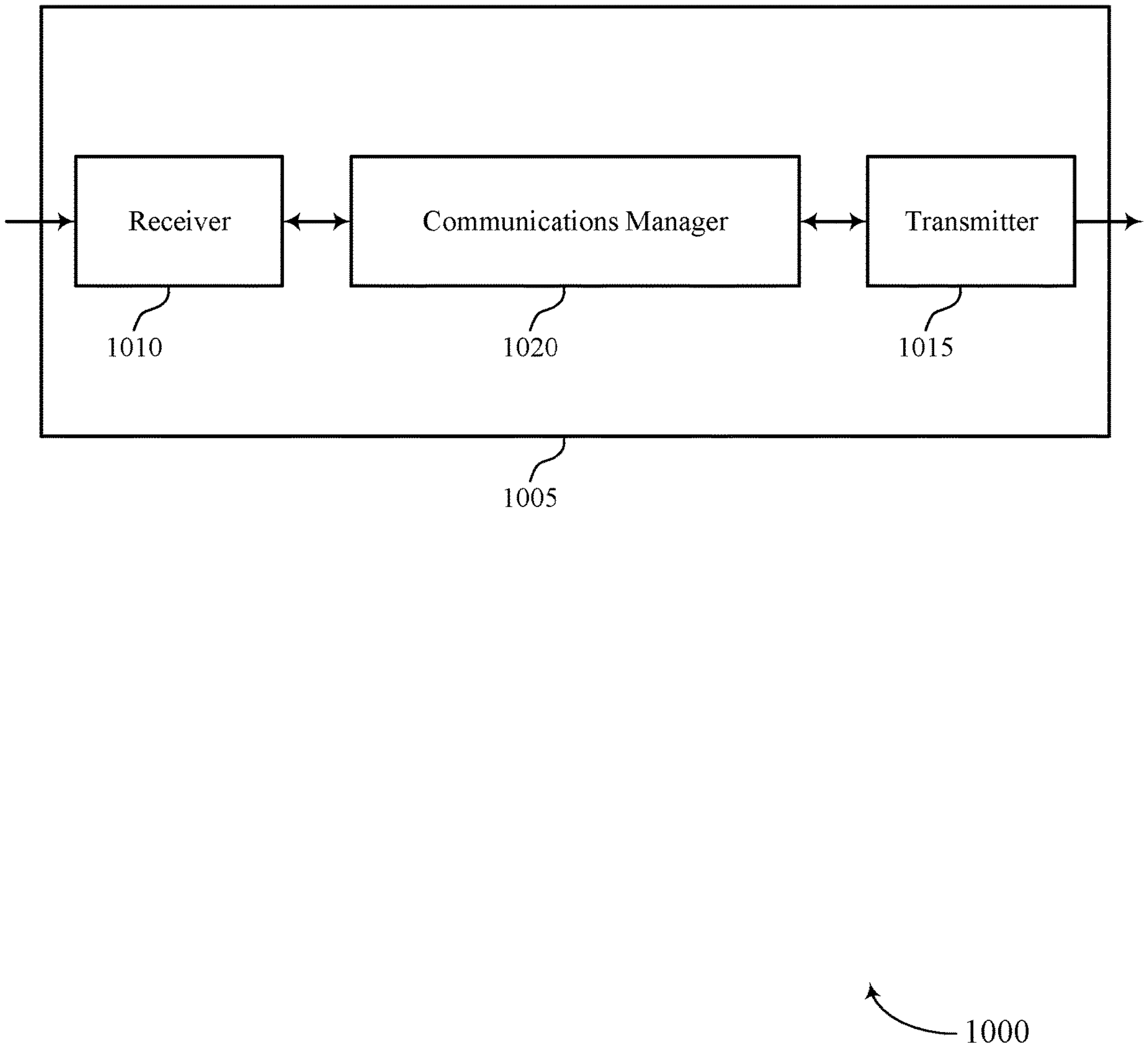
FIGS. 10 and 11 show block diagrams of devices that support techniques for paging offloading in accordance with one or more aspects of the present disclosure.

FIG. 10 shows a block diagram 1000 of a device 1005 that supports techniques for paging offloading in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for paging offloading as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and a memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a core network entity in accordance with examples as disclosed herein. For example, the communications manager 1020 may be configured as or otherwise support a means for receiving, from a first network entity, a control message requesting the core network entity to transmit paging messages via a second network entity. The communications manager 1020 may be configured as or otherwise support a means for transmitting an acknowledgment message responsive to the control message. The communications manager 1020 may be configured as or otherwise support a means for transmitting, to a UE, a paging message via the first network entity, the second network entity, or both, based on the acknowledgment message.

Additionally, or alternatively, the communications manager 1020 may support wireless communications at a first network entity in accordance with examples as disclosed herein. For example, the communications manager 1020 may be configured as or otherwise support a means for transmitting, to a core network entity, a first control message requesting the core network entity to transmit paging messages via a second network entity. The communications manager 1020 may be configured as or otherwise support a means for receiving an acknowledgment message responsive to the first control message. The communications manager 1020 may be configured as or otherwise support a means for transmitting, to a UE, a second control message indicating one or more parameters associated with the UE selecting one or more cells to monitor for a paging message in an idle, inactive or any non-connected mode and with the UE selecting one or more cells to establish a connection.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for paging offloading which may result in reduced processing, reduced power consumption, and more efficient utilization of communication resources, among other advantages.

Figure 11:
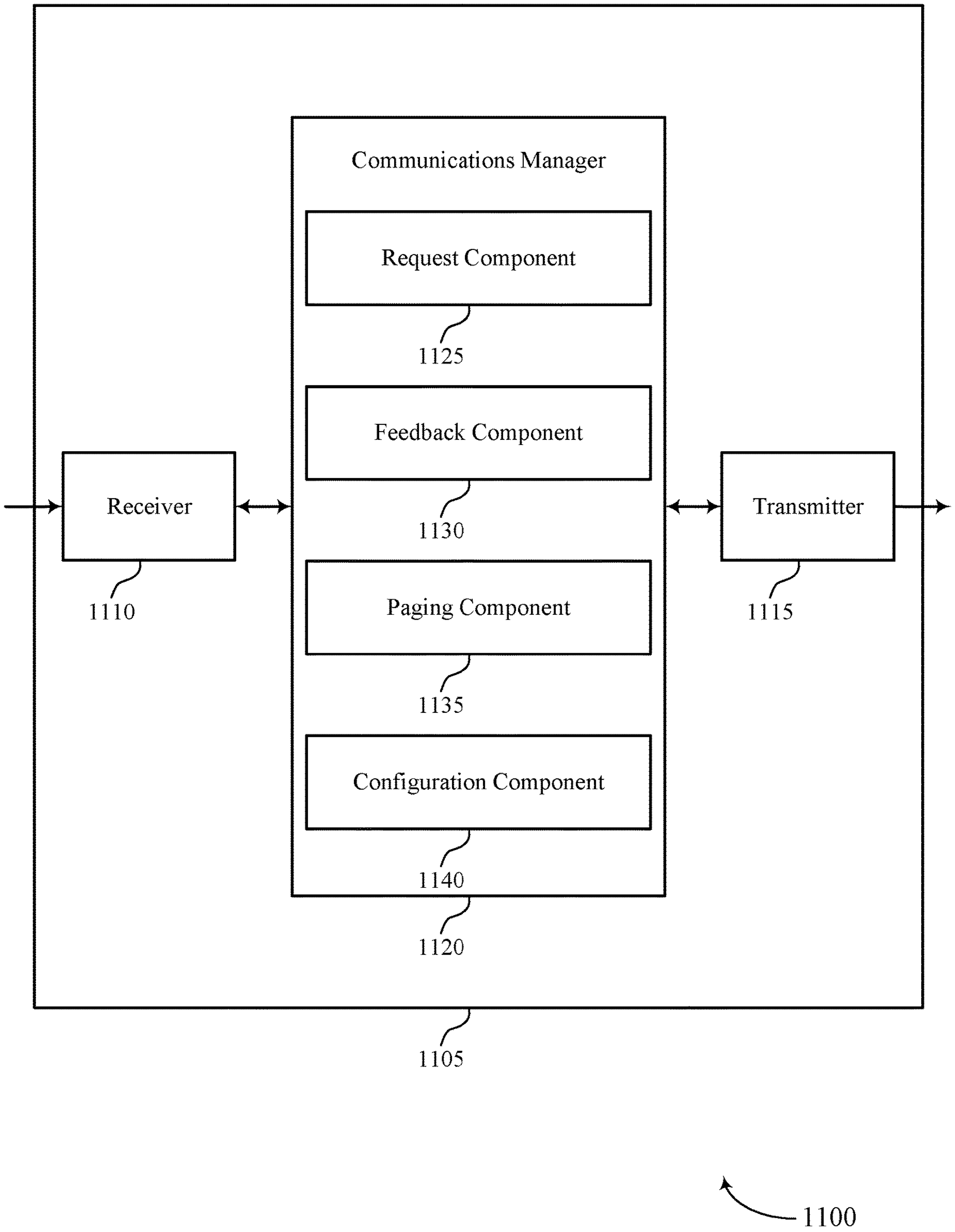

FIG. 11 shows a block diagram 1100 of a device 1105 that supports techniques for paging offloading in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for paging offloading as described herein. For example, the communications manager 1120 may include a request component 1125, a feedback component 1130, a paging component 1135, a configuration component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a core network entity in accordance with examples as disclosed herein. The request component 1125 may be configured as or otherwise support a means for receiving, from a first network entity, a control message requesting the core network entity to transmit paging messages via a second network entity. The feedback component 1130 may be configured as or otherwise support a means for transmitting an acknowledgment message responsive to the control message. The paging component 1135 may be configured as or otherwise support a means for transmitting, to a UE, a paging message via the first network entity, the second network entity, or both, based on the acknowledgment message.

Additionally, or alternatively, the communications manager 1120 may support wireless communications at a first network entity in accordance with examples as disclosed herein. The request component 1125 may be configured as or otherwise support a means for transmitting, to a core network entity, a first control message requesting the core network entity to transmit paging messages via a second network entity. The feedback component 1130 may be configured as or otherwise support a means for receiving an acknowledgment message responsive to the first control message. The configuration component 1140 may be configured as or otherwise support a means for transmitting, to a UE, a second control message indicating one or more parameters associated with the UE selecting one or more cells to monitor for a paging message in an idle, inactive or any non-connected mode and with the UE selecting one or more cells to establish a connection.

Figure 12:
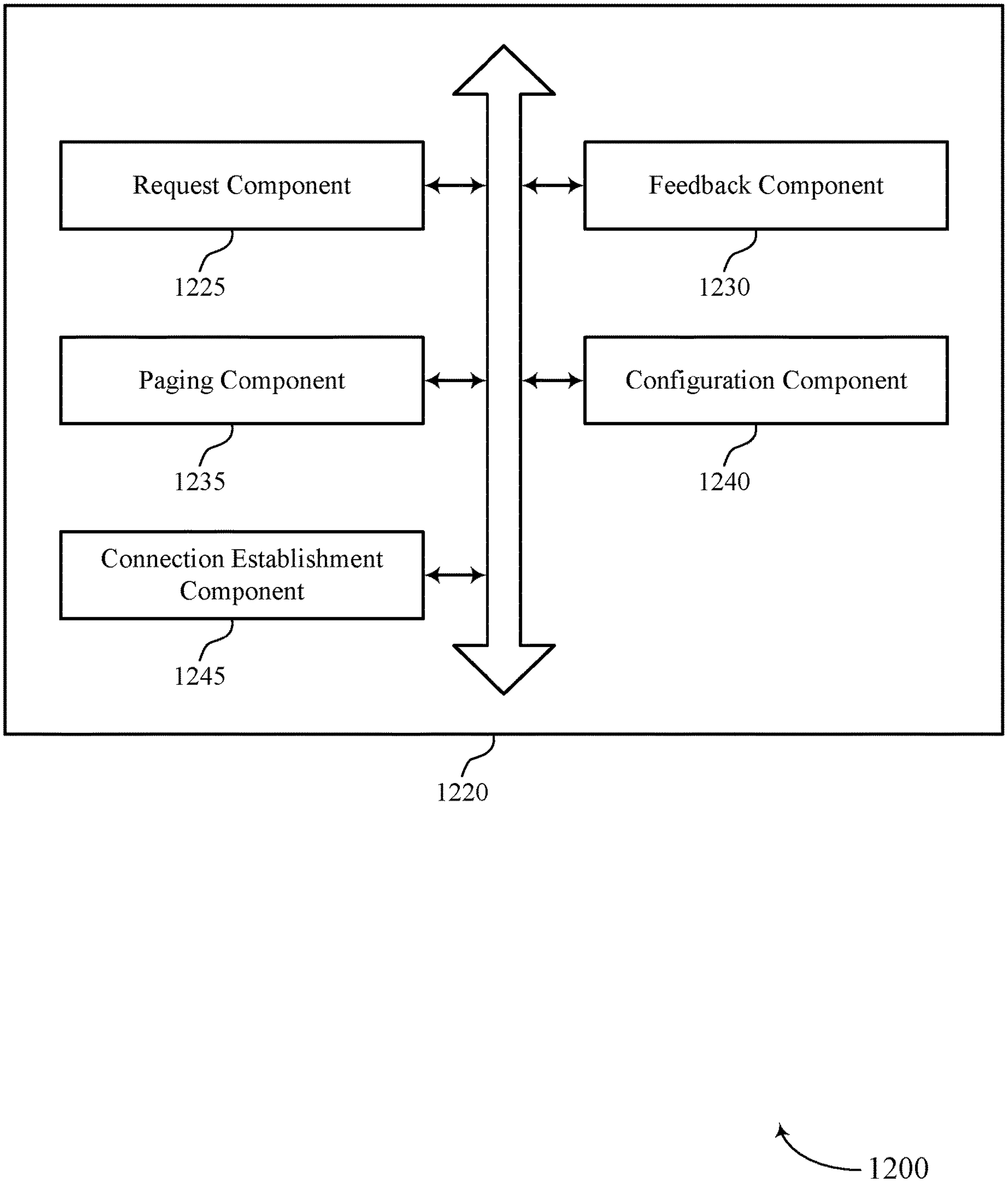
FIG. 12 shows a block diagram of a communications manager that supports techniques for paging offloading in accordance with one or more aspects of the present disclosure.

FIG. 12 shows a block diagram 1200 of a communications manager 1220 that supports techniques for paging offloading in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for paging offloading as described herein. For example, the communications manager 1220 may include a request component 1225, a feedback component 1230, a paging component 1235, a configuration component 1240, a connection establishment component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a core network entity in accordance with examples as disclosed herein. The request component 1225 may be configured as or otherwise support a means for receiving, from a first network entity, a control message requesting the core network entity to transmit paging messages via a second network entity. The feedback component 1230 may be configured as or otherwise support a means for transmitting an acknowledgment message responsive to the control message. The paging component 1235 may be configured as or otherwise support a means for transmitting, to a UE, a paging message via the first network entity, the second network entity, or both, based on the acknowledgment message.

In some examples, to support transmitting the paging message, the paging component 1235 may be configured as or otherwise support a means for transmitting the paging message via the second network entity.

In some examples, the feedback component 1230 may be configured as or otherwise support a means for receiving a message indicating failure of the UE to detect the second network entity, where transmitting the paging message via the first network entity is based on the UE failing to detect the second network entity.

In some examples, to support transmitting the paging message, the paging component 1235 may be configured as or otherwise support a means for transmitting the paging message via the first network entity.

In some examples, the feedback component 1230 may be configured as or otherwise support a means for receiving a second control message indicating the first network entity established a connection with the UE based on the UE receiving the paging message.

In some examples, the feedback component 1230 may be configured as or otherwise support a means for transmitting a second acknowledgment message responsive to the second control message.

In some examples, the paging message indicates a group identifier associated with a group including at least the UE.

In some examples, the group identifier includes a P-RNTI.

In some examples, the paging component 1235 may be configured as or otherwise support a means for receiving a second control message indicating an occasion for transmission of the paging message.

In some examples, the second control message indicates an identifier associated with the UE.

In some examples, the first network entity is associated with a TN and the second network entity is associated with a NTN.

Additionally, or alternatively, the communications manager 1220 may support wireless communications at a first network entity in accordance with examples as disclosed herein. In some examples, the request component 1225 may be configured as or otherwise support a means for transmitting, to a core network entity, a first control message requesting the core network entity to transmit paging messages via a second network entity. In some examples, the feedback component 1230 may be configured as or otherwise support a means for receiving an acknowledgment message responsive to the first control message. The configuration component 1240 may be configured as or otherwise support a means for transmitting, to a UE, a second control message indicating one or more parameters associated with the UE selecting one or more cells to monitor for a paging message in an idle, inactive or any non-connected mode and with the UE selecting one or more cells to establish a connection.

In some examples, the one or more parameters indicate frequency information, RAT information, network information, tracking area information, one or more cell identifiers, one or more PLMN identifiers, one or more slicing identifiers, a type of core network, a duration associated with monitoring the one or more selected cells, or any combination thereof.

In some examples, the feedback component 1230 may be configured as or otherwise support a means for receiving a capability message indicating a capability of the UE to support at least selection of the one or more cells to monitor for the paging message or selection of the one or more cells to establish the connection.

In some examples, the capability message includes an indication of one or more supported frequency bands, one or more supported RATs, one or more supported types of networks, one or more supported types of core networks, a battery status of the UE, a quantity of supported cells, or any combination thereof.

In some examples, the paging component 1235 may be configured as or otherwise support a means for receiving the paging message from the core network entity. In some examples, the paging component 1235 may be configured as or otherwise support a means for forwarding the paging message to the UE.

In some examples, the connection establishment component 1245 may be configured as or otherwise support a means for establishing the connection with the UE.

In some examples, the feedback component 1230 may be configured as or otherwise support a means for transmitting, to the core network entity, a third control message indicating the first network entity established the connection with the UE.

In some examples, the feedback component 1230 may be configured as or otherwise support a means for receiving a second acknowledgment message responsive to the third control message.

Figure 13:
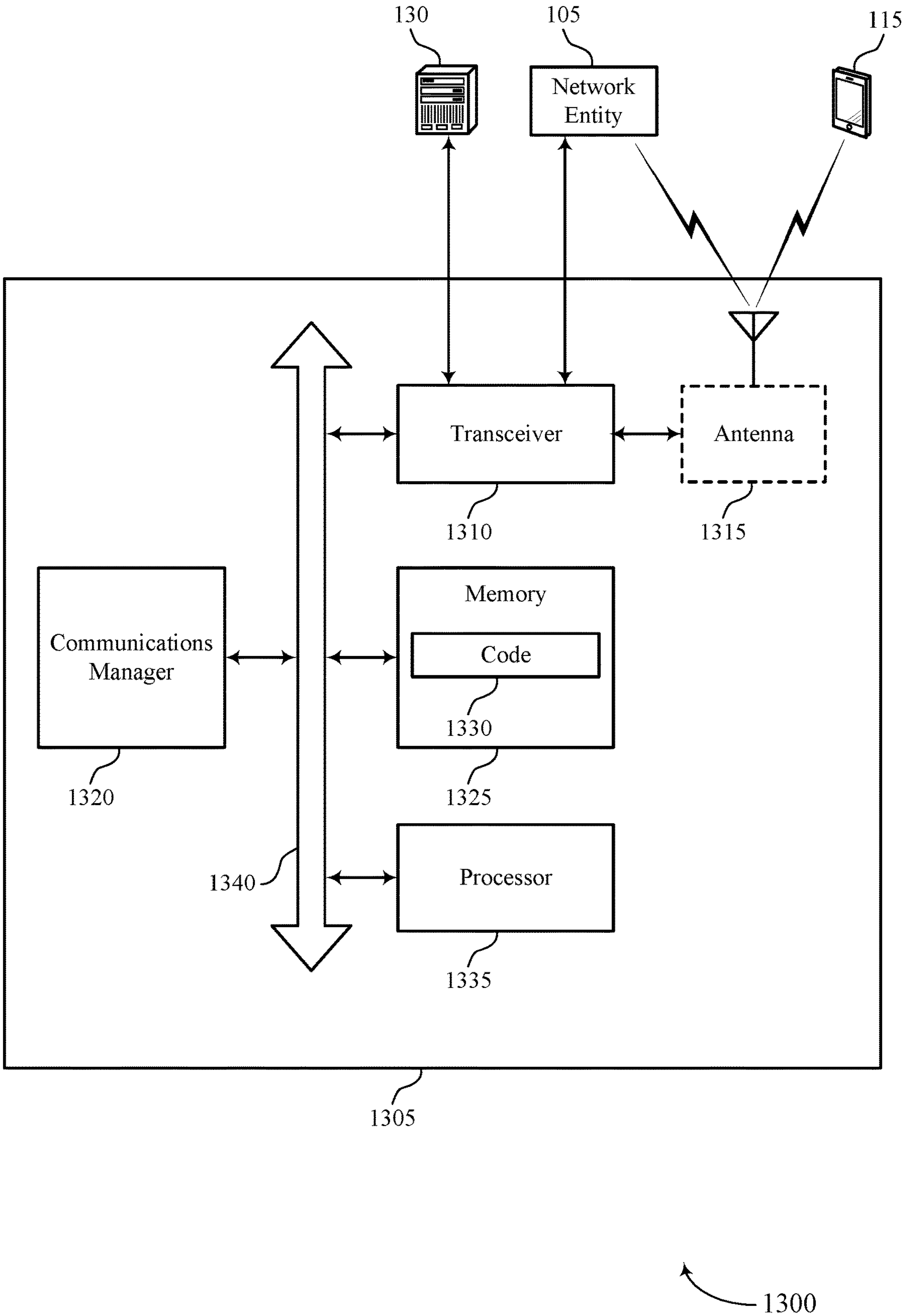
FIG. 13 shows a diagram of a system including a device that supports techniques for paging offloading in accordance with one or more aspects of the present disclosure.

FIG. 13 shows a diagram of a system 1300 including a device 1305 that supports techniques for paging offloading in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for paging offloading). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a core network entity in accordance with examples as disclosed herein. For example, the communications manager 1320 may be configured as or otherwise support a means for receiving, from a first network entity, a control message requesting the core network entity to transmit paging messages via a second network entity. The communications manager 1320 may be configured as or otherwise support a means for transmitting an acknowledgment message responsive to the control message. The communications manager 1320 may be configured as or otherwise support a means for transmitting, to a UE, a paging message via the first network entity, the second network entity, or both, based on the acknowledgment message.

Additionally, or alternatively, the communications manager 1320 may support wireless communications at a first network entity in accordance with examples as disclosed herein. For example, the communications manager 1320 may be configured as or otherwise support a means for transmitting, to a core network entity, a first control message requesting the core network entity to transmit paging messages via a second network entity. The communications manager 1320 may be configured as or otherwise support a means for receiving an acknowledgment message responsive to the first control message. The communications manager 1320 may be configured as or otherwise support a means for transmitting, to a UE, a second control message indicating one or more parameters associated with the UE selecting one or more cells to monitor for a paging message in an idle, inactive or any non-connected mode and with the UE selecting one or more cells to establish a connection.

By including or configuring the communications manager 1320 in accordance with examples as described herein, the device 1305 may support techniques for paging offloading which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for paging offloading as described herein, or the processor 1335 and the memory 1325 may be otherwise configured to perform or support such operations.

Figure 14:
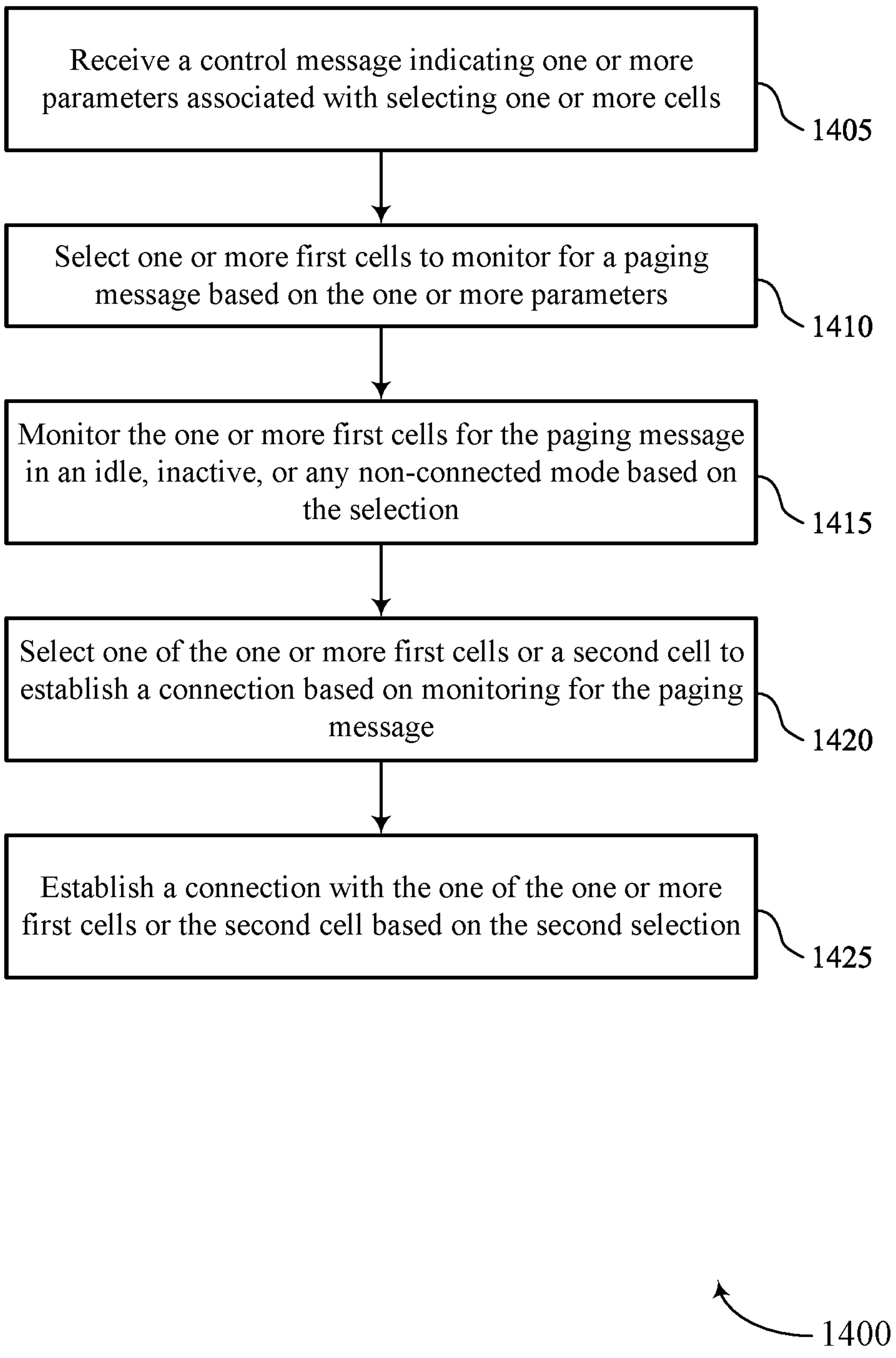
FIGS. 14 through 16 show flowcharts illustrating methods that support techniques for paging offloading in accordance with one or more aspects of the present disclosure.

FIG. 14 shows a flowchart illustrating a method 1400 that supports techniques for paging offloading in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a control message indicating one or more parameters associated with selecting one or more cells. The operations of 1405 may be performed in accordance with examples as disclosed herein. In some examples, aspects of the operations of 1405 may be performed by a configuration component 825 as described with reference to FIG. 8.

At 1410, the method may include selecting one or more first cells to monitor for a paging message based on the one or more parameters. The operations of 1410 may be performed in accordance with examples as disclosed herein. In some examples, aspects of the operations of 1410 may be performed by a selection component 830 as described with reference to FIG. 8.

At 1415, the method may include monitoring the one or more first cells for the paging message in an idle mode, inactive mode, or any non-connected mode based on the selection. The operations of 1415 may be performed in accordance with examples as disclosed herein. In some examples, aspects of the operations of 1415 may be performed by a monitoring component 835 as described with reference to FIG. 8.

At 1420, the method may include selecting one of the one or more first cells or a second cell to establish a connection based on monitoring for the paging message. The operations of 1420 may be performed in accordance with examples as disclosed herein. In some examples, aspects of the operations of 1420 may be performed by a selection component 830 as described with reference to FIG. 8.

At 1425, the method may include establishing the connection with the one of the one or more first cells or the second cell based on the second selection. The operations of 1425 may be performed in accordance with examples as disclosed herein. In some examples, aspects of the operations of 1425 may be performed by a connection establishment component 840 as described with reference to FIG. 8.

Figure 15:
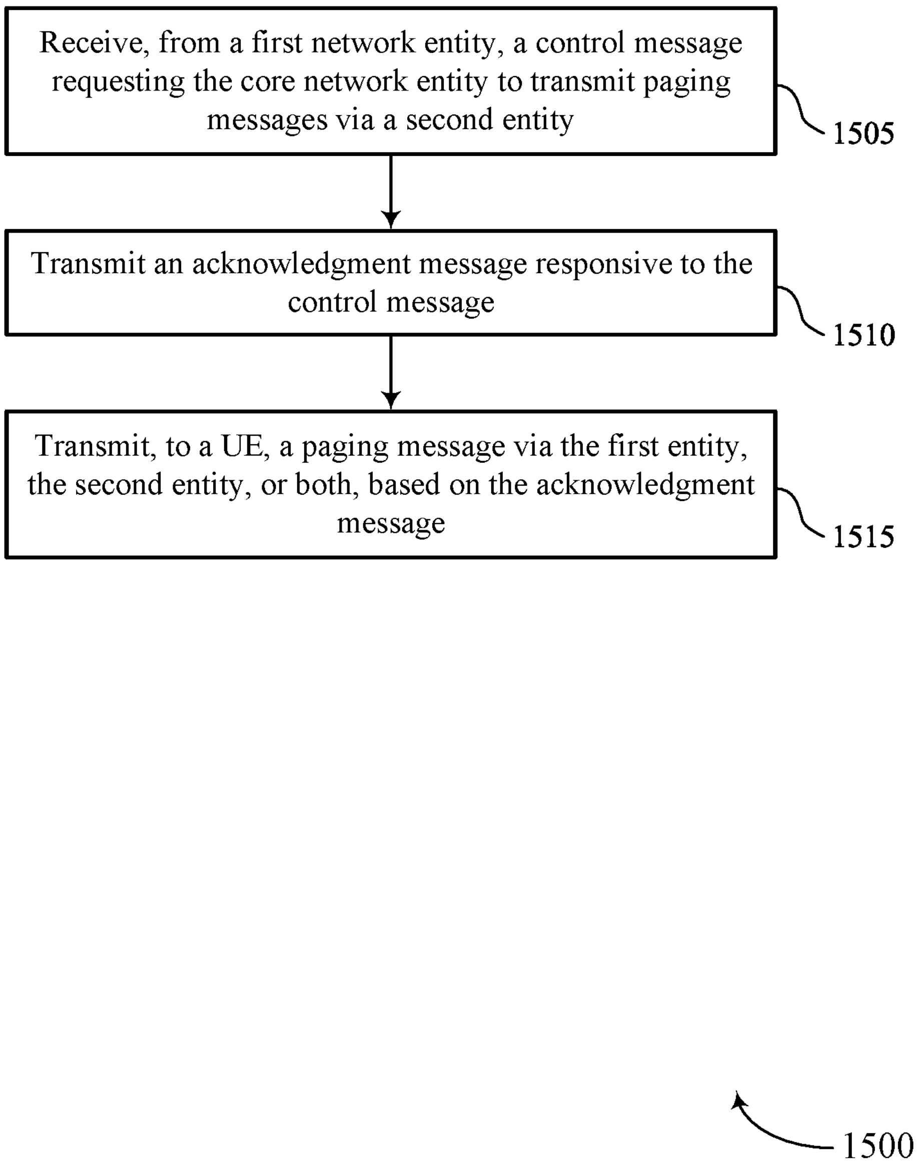

FIG. 15 shows a flowchart illustrating a method 1500 that supports techniques for paging offloading in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a first network entity, a control message requesting the core network entity to transmit paging messages via a second network entity. The operations of 1505 may be performed in accordance with examples as disclosed herein. In some examples, aspects of the operations of 1505 may be performed by a request component 1225 as described with reference to FIG. 12.

At 1510, the method may include transmitting an acknowledgment message responsive to the control message. The operations of 1510 may be performed in accordance with examples as disclosed herein. In some examples, aspects of the operations of 1510 may be performed by a feedback component 1230 as described with reference to FIG. 12.

At 1515, the method may include transmitting, to a UE, a paging message via the first network entity, the second network entity, or both, based on the acknowledgment message. The operations of 1515 may be performed in accordance with examples as disclosed herein. In some examples, aspects of the operations of 1515 may be performed by a paging component 1235 as described with reference to FIG. 12.

Figure 16:
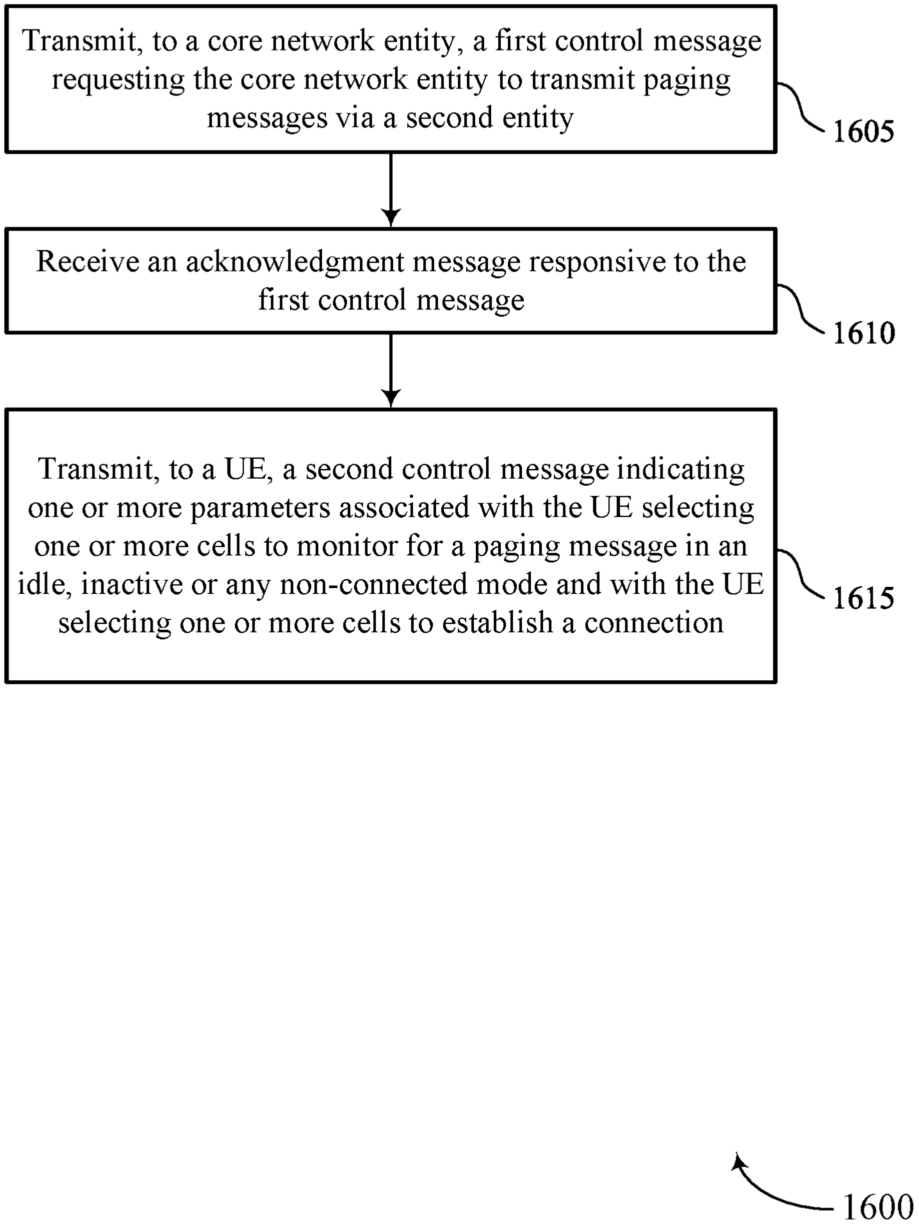

FIG. 16 shows a flowchart illustrating a method 1600 that supports techniques for paging offloading in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a core network entity, a first control message requesting the core network entity to transmit paging messages via a second network entity. The operations of 1605 may be performed in accordance with examples as disclosed herein. In some examples, aspects of the operations of 1605 may be performed by a request component 1225 as described with reference to FIG. 12.

At 1610, the method may include receiving an acknowledgment message responsive to the first control message. The operations of 1610 may be performed in accordance with examples as disclosed herein. In some examples, aspects of the operations of 1610 may be performed by a feedback component 1230 as described with reference to FIG. 12.

At 1615, the method may include transmitting, to a UE, a second control message indicating one or more parameters associated with the UE selecting one or more cells to monitor for a paging message in an idle, inactive or any non-connected mode and with the UE selecting one or more cells to establish a connection. The operations of 1615 may be performed in accordance with examples as disclosed herein. In some examples, aspects of the operations of 1615 may be performed by a configuration component 1240 as described with reference to FIG. 12.

The following provides an overview of aspects of the present disclosure:

Aspect 1: A method for wireless communications at a UE comprising: receiving a control message indicating one or more parameters associated with selecting one or more cells; selecting one or more first cells to monitor for a paging message based at least in part on the one or more parameters; monitoring the one or more first cells for the paging message in an idle mode, inactive mode, or any non-connected mode based at least in part on the selection; selecting one of the one or more first cells or a second cell to establish a connection based at least in part on monitoring for the paging message; and establishing a connection with the one of the one or more first cells or the second cell based at least in part on the second selection.

Aspect 2: The method of aspect 1, wherein selecting the one of the one or more first cells or the second cell is based at least in part on the one or more parameters.

Aspect 3: The method of any of aspects 1 through 2, wherein selecting the one of the one or more first cells or the second cell is based at least in part on one or more conditions at the UE.

Aspect 4: The method of any of aspects 1 through 3, wherein the control message is received from one of the one or more first cells or the second cell.

Aspect 5: The method of any of aspects 1 through 4, wherein the one or more first cells comprises at least a first cell associated with a NTN, and the second cell is associated with a TN.

Aspect 6: The method of any of aspects 1 through 4, wherein the one or more first cells comprises at least a first cell associated with a NTN and a first cell associated with TN.

Aspect 7: The method of any of aspects 1 through 6, wherein the one or more parameters indicate frequency information, RAT information, network information, tracking area information, one or more cell identifiers, one or more PLMN identifiers, one or more slicing identifiers, a type of core network, a duration associated with monitoring the one or more first cells, or any combination thereof.

Aspect 8: The method of aspect 7, further comprising: stopping monitoring of the one or more first cells based at least in part on expiration of a timer, wherein a duration of the timer is based at least in part on the indicated duration.

Aspect 9: The method of any of aspects 1 through 8, further comprising: transmitting a capability message indicating a capability of the UE to support at least selection of the one or more first cells for paging monitoring or selection of the one of the one or more first cells or the second cell for connection establishment.

Aspect 10: The method of aspect 9, wherein the capability message comprises an indication of one or more supported frequency bands, one or more supported RATs, one or more supported types of networks, one or more supported types of core networks, a battery status of the UE, a quantity of supported cells, or any combination thereof.

Aspect 11: The method of any of aspects 1 through 10, further comprising: receiving the paging message from each of the one or more first cells.

Aspect 12: The method of any of aspects 1 through 10, further comprising: receiving the paging message from one of the one or more first cells.

Aspect 13: The method of any of aspects 1 through 12, further comprising: selecting the one or more first cells to receive the paging message based at least in part on failing to detect the second cell.

Aspect 14: The method of any of aspects 1 through 13, further comprising: transmitting a failure message based at least in part on failing to detect the second cell or a third cell.

Aspect 15: The method of aspect 14, wherein the second cell is a first available cell associated with an NTN and the third cell is a second available cell associated with the NTN.

Aspect 16: The method of any of aspects 1 through 15, wherein establishing the connection comprises: establishing the connection with the one of the one or more first cells based at least in part on failing to detect the second cell or establishing the connection with the second cell.

Aspect 17: The method of any of aspects 1 through 16, wherein the paging message indicates a group identifier associated with a group including at least the UE.

Aspect 18: The method of aspect 17, wherein the group identifier comprises a P-RNTI.

Aspect 19: The method of any of aspects 1 through 18, further comprising: receiving a second control message indicating an occasion for transmission of the paging message.

Aspect 20: The method of aspect 19, wherein the second control message indicates an identifier associated with the UE.

Aspect 21: A method for wireless communications at a core network entity, comprising: receiving, from a first network entity, a control message requesting the core network entity to transmit paging messages via a second network entity; transmitting an acknowledgment message responsive to the control message; and transmitting, to a UE, a paging message via the first network entity, the second network entity, or both, based at least in part on the acknowledgment message.

Aspect 22: The method of aspect 21, wherein transmitting the paging message comprises: transmitting the paging message via the second network entity.

Aspect 23: The method of aspect 22, further comprising: receiving a message indicating failure of the UE to detect the second network entity, wherein transmitting the paging message via the first network entity is based at least in part on the UE failing to detect the second network entity.

Aspect 24: The method of any of aspects 21 through 23, wherein transmitting the paging message comprises: transmitting the paging message via the first network entity.

Aspect 25: The method of any of aspects 21 through 24, further comprising: receiving a second control message indicating the first network entity established a connection with the UE based at least in part on the UE receiving the paging message.

Aspect 26: The method of aspect 25, further comprising: transmitting a second acknowledgment message responsive to the second control message.

Aspect 27: The method of any of aspects 21 through 26, wherein the paging message indicates a group identifier associated with a group including at least the UE.

Aspect 28: The method of aspect 27, wherein the group identifier comprises a P-RNTI.

Aspect 29: The method of any of aspects 21 through 28, further comprising: receiving a second control message indicating an occasion for transmission of the paging message.

Aspect 30: The method of aspect 29, wherein the second control message indicates an identifier associated with the UE.

Aspect 31: The method of any of aspects 21 through 30, wherein the first network entity is associated with a TN and the second network entity is associated with a NTN.

Aspect 32: A method for wireless communications at a first network entity, comprising: transmitting, to a core network entity, a first control message requesting the core network entity to transmit paging messages via a second network entity; receiving an acknowledgment message responsive to the first control message; and transmitting, to a UE, a second control message indicating one or more parameters associated with the UE selecting one or more cells to monitor for a paging message in an idle, inactive or any non-connected mode and with the UE selecting one or more cells to establish a connection.

Aspect 33: The method of aspect 32, wherein the one or more parameters indicate frequency information, RAT information, network information, tracking area information, one or more cell identifiers, one or more PLMN identifiers, one or more slicing identifiers, a type of core network, a duration associated with monitoring the one or more selected cells, or any combination thereof.

Aspect 34: The method of any of aspects 32 through 33, further comprising: receiving a capability message indicating a capability of the UE to support at least selection of the one or more cells to monitor for the paging message or selection of the one or more cells to establish the connection.

Aspect 35: The method of aspect 34, wherein the capability message comprises an indication of one or more supported frequency bands, one or more supported RATs, one or more supported types of networks, one or more supported types of core networks, a battery status of the UE, a quantity of supported cells, or any combination thereof.

Aspect 36: The method of any of aspects 32 through 35, further comprising: receiving the paging message from the core network entity; and forwarding the paging message to the UE.

Aspect 37: The method of any of aspects 32 through 36, further comprising: establishing the connection with the UE.

Aspect 38: The method of aspect 37, further comprising: transmitting, to the core network entity, a third control message indicating the first network entity established the connection with the UE.

Aspect 39: The method of aspect 38, further comprising: receiving a second acknowledgment message responsive to the third control message.

Aspect 40: An apparatus comprising a processor; and a memory coupled with the processor, with instructions stored in the memory being executable by the processor to cause the apparatus to perform a method of any of aspects 1 through 20.

Aspect 41: An apparatus comprising at least one means for performing a method of any of aspects 1 through 20.

Aspect 42: A non-transitory computer-readable medium storing code the code comprising instructions executable by a processor to perform a method of any of aspects 1 through 20.

Aspect 43: An apparatus for wireless communications at a core network entity, comprising a processor; and a memory coupled with the processor, with instructions stored in the memory being executable by the processor to cause the apparatus to perform a method of any of aspects 21 through 31.

Aspect 44: An apparatus for wireless communications at a core network entity, comprising at least one means for performing a method of any of aspects 21 through 31.

Aspect 45: A non-transitory computer-readable medium storing code for wireless communications at a core network entity, the code comprising instructions executable by a processor to perform a method of any of aspects 21 through 31.

Aspect 46: An apparatus for wireless communications at a first network entity, comprising a processor; and a memory coupled with the processor, with instructions stored in the memory being executable by the processor to cause the apparatus to perform a method of any of aspects 32 through 39.

Aspect 47: An apparatus for wireless communications at a first network entity, comprising at least one means for performing a method of any of aspects 32 through 39.

Aspect 48: A non-transitory computer-readable medium storing code for wireless communications at a first network entity, the code comprising instructions executable by a processor to perform a method of any of aspects 32 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor; and at least one memory coupled with the at least one processor, with instructions stored in the at least one memory, the instructions being executable by the at least one processor to cause the UE to:

receive a control message indicating one or more parameters for monitoring a first cell for a paging message corresponding to a second cell, wherein a second coverage area of the second cell is within a first coverage area of the first cell;

monitor the first cell for the paging message corresponding to the second cell, wherein the monitoring is conducted in an idle mode, inactive mode, or any non-connected mode in accordance with the one or more parameters; and establish a connection with the one of the one or more first cell or the second cell based at least in part on the monitoring of the first cell for the paging message.

2. The apparatus of claim 1, wherein establishment of the connection with the first cell or the second cell is based at least in part on the one or more parameters.

3. The apparatus of claim 1, wherein establishment of the connection with the first cell or the second cell is based at least in part on one or more conditions at the UE.

4. The apparatus of claim 1, wherein the control message is received from one of the first cell or the second cell.

5. The apparatus of claim 1, wherein the first cell corresponds to a non-terrestrial network, and wherein the second cell corresponds to a terrestrial network.

6. The apparatus of claim 1, wherein the instructions to establish the connection are executable by the at least one processor to cause the UE to:

establish the connection with the second cell based at least in part on receiving the paging message from the first cell.

7. The apparatus of claim 1, wherein the one or more parameters indicate frequency information, radio access technology information, network information, tracking area information, one or more cell identifiers, one or more public land mobile network identifiers, one or more slicing identifiers, a type of core network, a duration associated with monitoring the first cell, or any combination thereof.

8. The apparatus of claim 7, wherein the instructions are further executable by the at least one processor to cause the UE to:

stop monitoring of the first cell based at least in part on expiration of a timer, wherein a duration of the timer is based at least in part on the indicated duration.

9. The apparatus of claim 1, wherein the instructions are further executable by the at least one processor to cause the UE to:

transmit a capability message indicating a capability of the UE to support at least selection of the first cell for paging monitoring or selection of the first cell or the second cell for connection establishment.

10. The apparatus of claim 9, wherein the capability message comprises an indication of one or more supported frequency bands, one or more supported radio access technologies, one or more supported types of networks, one or more supported types of core networks, a battery status of the UE, a quantity of supported cells, or any combination thereof.

11. The apparatus of claim 1, wherein the first cell is from a plurality of cells, and wherein, to monitor the first cell for the paging message, the instructions are further executable by the at least one processor to cause the UE to:

monitor the plurality of cells for the paging message, and wherein the instructions are further executable by the at least one processor to cause the UE to:

receive the paging message from each cell of the plurality of cells.

12. The apparatus of claim 1, wherein the first cell is from a plurality of cells, and wherein, to monitor the first cell for the paging message, the instructions are further executable by the at least one processor to cause the UE to:

monitor the plurality of cells for the paging message, and wherein the instructions are further executable by the at least one processor to cause the UE to:

receive the paging message from the first cell.

13. The apparatus of claim 1, wherein the instructions are further executable by the at least one processor to cause the UE to:

select the first cell to monitor for the paging message based at least in part on failing to detect the second cell.

14. The apparatus of claim 1, wherein the first cell corresponds to a non-terrestrial network associated with a geostationary orbit (GSO) and wherein the second cell corresponds to a non-terrestrial network associated with a non-GSO (NGSO).

15. A method for wireless communications at a user equipment (UE) comprising:

receiving a control message indicating one or more parameters for monitoring a first cell for a paging message corresponding to a second cell, wherein a second coverage area of the second cell is within a first coverage area of the first cell;

monitoring the first cell for the paging message corresponding to the second cell, wherein the monitoring is conducted in an idle mode, inactive mode, or any non-connected mode in accordance with the one or more parameters; and establishing a connection with the first cell or the second cell based at least in part on the monitoring of the first cell for the paging message.

16. The method of claim 15, wherein establishment of the connection with the first cell or the second cell is based at least in part on the one or more parameters.

17. The method of claim 15, wherein establishment of the connection with the first cell or the second cell is based at least in part on one or more conditions at the UE.

18. The method of claim 15, wherein the control message is received from one of the first cell or the second cell.

19. The method of claim 15, wherein the first cell corresponds to a non-terrestrial network, and wherein the second cell corresponds to a terrestrial network.

20. The method of claim 15, further comprising:

establishing the connection with the second cell based at least in part on receiving the paging message from the first cell.

21. The method of claim 15, wherein the one or more parameters indicate frequency information, radio access technology information, network information, tracking area information, one or more cell identifiers, one or more public land mobile network identifiers, one or more slicing identifiers, a type of core network, a duration associated with monitoring the first cell, or any combination thereof.

22. The method of claim 21, further comprising:

stopping monitoring of the first cell based at least in part on expiration of a timer, wherein a duration of the timer is based at least in part on the indicated duration.

23. The method of claim 15, further comprising:

transmitting a capability message indicating a capability of the UE to support at least selection of the first cell for paging monitoring or selection of the first cell or the second cell for connection establishment.

24. The method of claim 23, wherein the capability message comprises an indication of one or more supported frequency bands, one or more supported radio access technologies, one or more supported types of networks, one or more supported types of core networks, a battery status of the UE, a quantity of supported cells, or any combination thereof.

25. The method of claim 15, further comprising:

selecting the first cell to monitor for the paging message based at least in part on failing to detect the second cell.

26. The method of claim 15, wherein the first cell corresponds to a non-terrestrial network associated with a geostationary orbit (GSO) and wherein the second cell corresponds to a non-terrestrial network associated with a non-GSO (NGSO).

27. An apparatus for wireless communications, comprising:

means for receiving a control message indicating one or more parameters for monitoring a first cell for a paging message corresponding to a second cell, wherein a second coverage area of the second cell is within a first coverage area of the first cell;

means for monitoring the first cell for the paging message corresponding to the second cell, wherein the monitoring is conducted in an idle mode, inactive mode, or any non-connected mode in accordance with the one or more parameters; and means for establishing a connection with the first cell or the second cell based at least in part on the monitoring of the first cell for the paging message.

28. The apparatus of claim 27, wherein the first cell corresponds to a non-terrestrial network associated with a geostationary orbit (GSO) and wherein the second cell corresponds to a non-terrestrial network associated with a non-GSO (NGSO).

29. A non-transitory computer-readable medium storing code for wireless communications, the code comprising instructions executable by one or more processors to:

receive a control message indicating one or more parameters for monitoring a first cell for a paging message corresponding to a second cell, wherein a second coverage area of the second cell is within a first coverage area of the first cell;

monitor the first cell for the paging message corresponding to the second cell, wherein the monitoring is conducted in an idle mode, inactive mode, or any non-connected mode in accordance with the one or more parameters; and establish a connection with the first cell or the second cell based at least in part on the monitoring of the first cell for the paging message.

30. The non-transitory computer-readable medium of claim 29, wherein the first cell corresponds to a non-terrestrial network associated with a geostationary orbit (GSO) and wherein the second cell corresponds to a non-terrestrial network associated with a non-GSO (NGSO).

* * * * *